United States Patent
Rohde et al.

(10) Patent No.: US 11,968,501 B2
(45) Date of Patent: Apr. 23, 2024

(54) HEARING DEVICE COMPRISING A TRANSMITTER

(71) Applicant: Oticon A/S, Smørum (DK)

(72) Inventors: Nels Hede Rohde, Smørum (DK); Thomas Bentsen, Smørum (DK); Anders Brødløs Olsen, Smørum (DK); Asger Heidemann Andersen, Smørum (DK); Michael Syskind Pedersen, Smørum (DK); Svend Oscar Petersen, Smørum (DK); Jesper Jensen, Smørum (DK); Michael Smed Kristensen, Ballerup (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 17/994,568

(22) Filed: Nov. 28, 2022

(65) Prior Publication Data

US 2023/0100340 A1 Mar. 30, 2023

Related U.S. Application Data

(62) Division of application No. 16/850,884, filed on Apr. 16, 2020, now Pat. No. 11,546,707.

(30) Foreign Application Priority Data

Apr. 17, 2019 (EP) .................................. 19169789
Nov. 21, 2019 (EP) .................................. 19210634

(51) Int. Cl.
*H04R 25/00* (2006.01)
*G10L 15/22* (2006.01)
(Continued)

(52) U.S. Cl.
CPC ............ *H04R 25/558* (2013.01); *G10L 15/22* (2013.01); *G10L 2015/088* (2013.01);
(Continued)

(58) Field of Classification Search
CPC ......... G10L 15/16; G10L 15/22; G10L 17/18; G10L 25/78; H04R 25/552; H04R 25/554; H04R 25/558
See application file for complete search history.

(56) References Cited

U.S. PATENT DOCUMENTS

| 5,636,285 A | 6/1997 | Sauer |
| 6,594,630 B1 | 7/2003 | Zlokarnik et al. |

(Continued)

FOREIGN PATENT DOCUMENTS

| EP | 0 834 861 A2 | 4/1998 |
| EP | 3 413 589 A1 | 12/2018 |

(Continued)

*Primary Examiner* — Rasha S Al Aubaidi
(74) *Attorney, Agent, or Firm* — Birch, Stewart, Kolasch & Birch, LLP

(57) ABSTRACT

A hearing device, e.g. a hearing aid, is configured to be arranged at least partly on a user's head or at least partly implanted in a user's head. The hearing device comprises a) at least one input transducer for picking up an input sound signal from the environment and providing at least one electric input signal representing said input sound signal; b) a signal processor connected to the at least one input transducer, the signal processor being configured to analyze the electric input signal and to provide a transmit control signal in dependence thereof; c) a memory buffer, e.g. a cyclic buffer, for storing a current time segment of a certain duration of said at least one electric input signal, or a processed version thereof; and a transmitter for transmitting at least a part of said time segment, or a processed version thereof, to an external device in dependence of said transmit control signal.

21 Claims, 20 Drawing Sheets

(51) Int. Cl.
  *G10L 15/08* (2006.01)
  *G10L 15/16* (2006.01)
(52) U.S. Cl.
  CPC ........ *G10L 15/16* (2013.01); *G10L 2015/223* (2013.01); *H04R 2225/61* (2013.01)

(56) References Cited

U.S. PATENT DOCUMENTS

| | | |
|---|---|---|
| 8,468,023 B1 | 6/2013 | Stracke et al. |
| 9,269,355 B1 | 2/2016 | Secker-Walker et al. |
| 10,102,844 B1 | 10/2018 | Mois et al. |
| 2006/0178159 A1 | 8/2006 | Timms et al. |
| 2012/0010890 A1 | 1/2012 | Koverzin |
| 2014/0321682 A1 | 10/2014 | Kofod-Hansen et al. |
| 2015/0230036 A1 | 8/2015 | Pedersen et al. |
| 2016/0283841 A1 | 9/2016 | Sainath et al. |
| 2018/0359364 A1 | 12/2018 | Gunther |
| 2019/0075406 A1 | 3/2019 | Petersen et al. |

FOREIGN PATENT DOCUMENTS

| | | |
|---|---|---|
| EP | 3 585 071 A1 | 12/2019 |
| EP | 3 585 073 A1 | 12/2019 |
| JP | 10-198397 A | 7/1998 |
| JP | 2006-39382 A | 2/2006 |
| WO | WO 2018/087570 A1 | 5/2018 |
| WO | WO 2018/183636 A1 | 10/2018 |

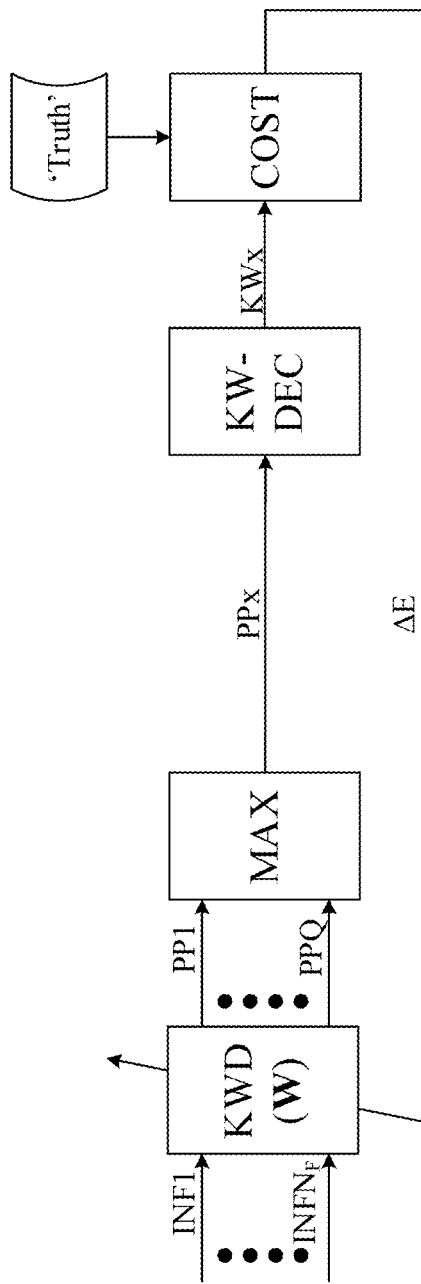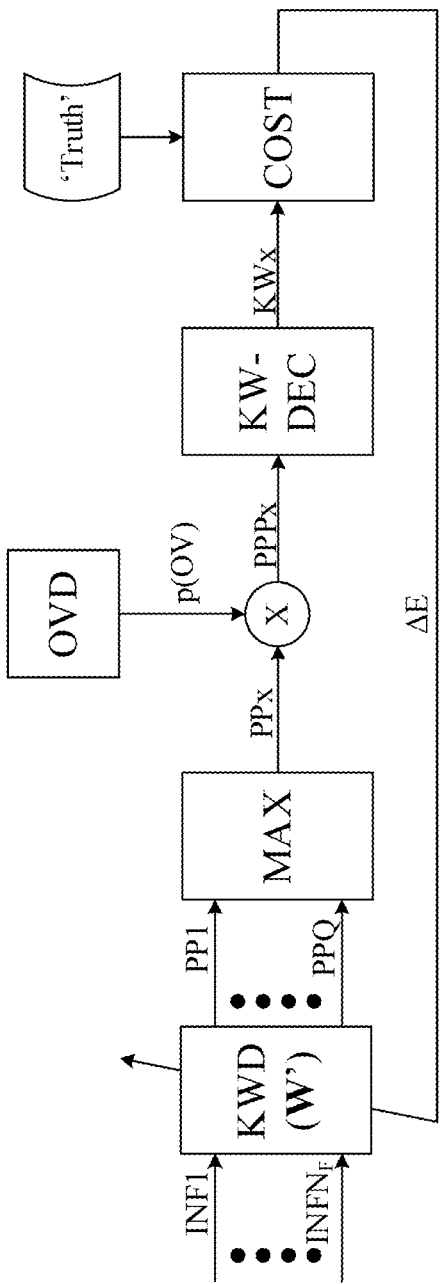
FIG. 3D
FIG. 3E

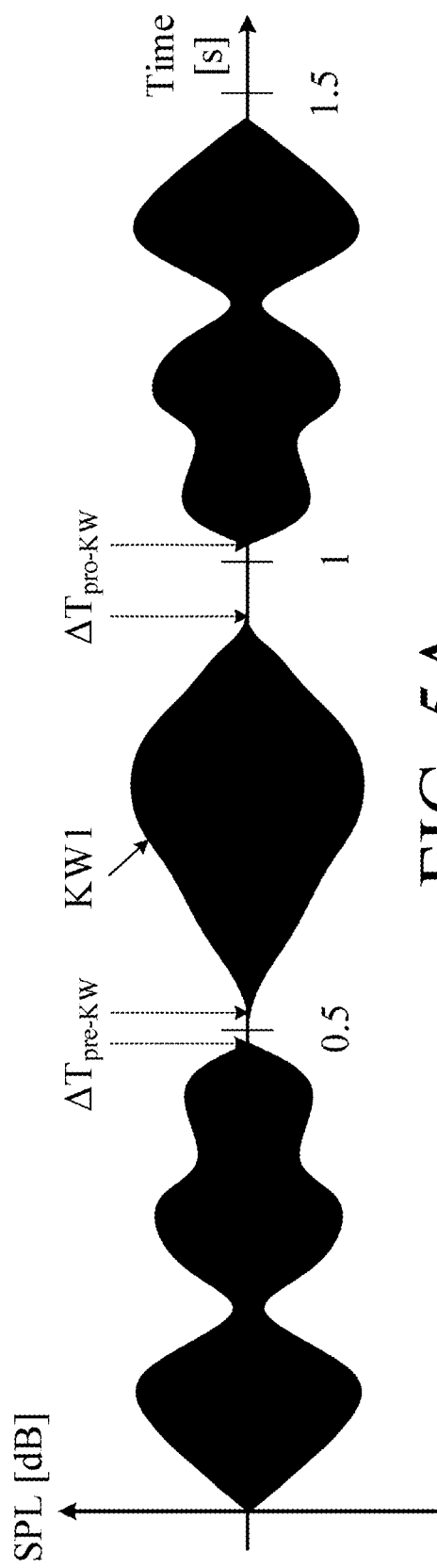
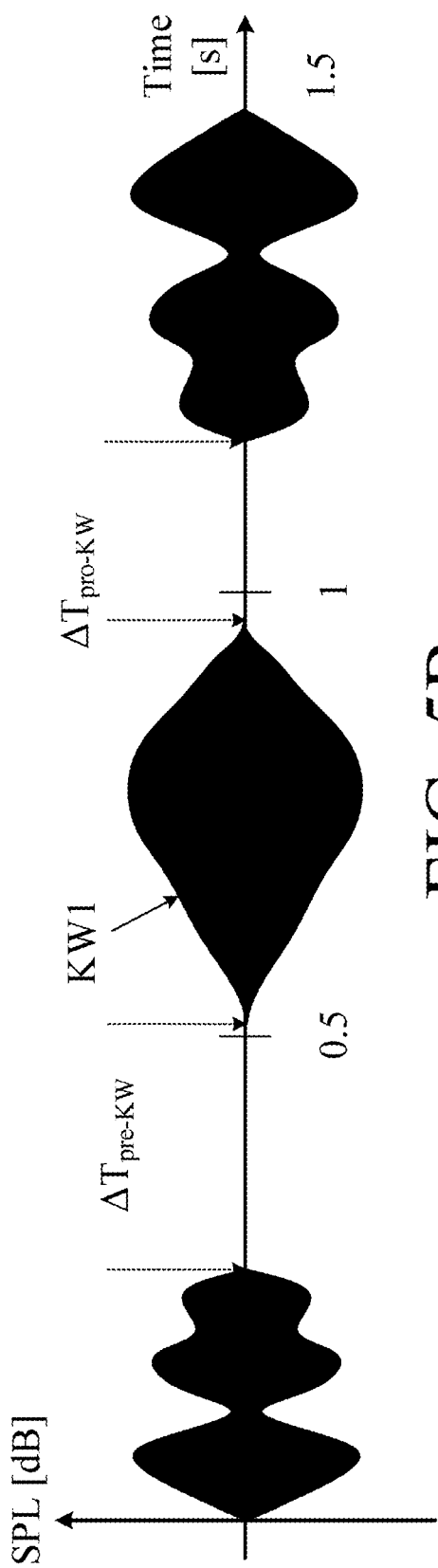

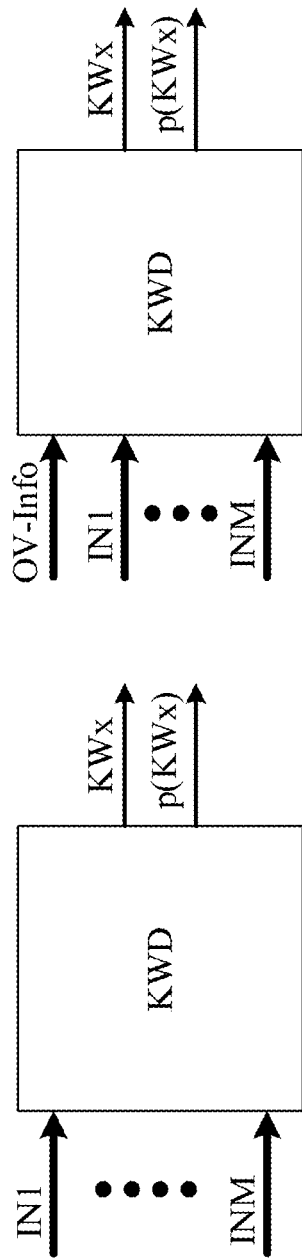
FIG. 6A
FIG. 6B
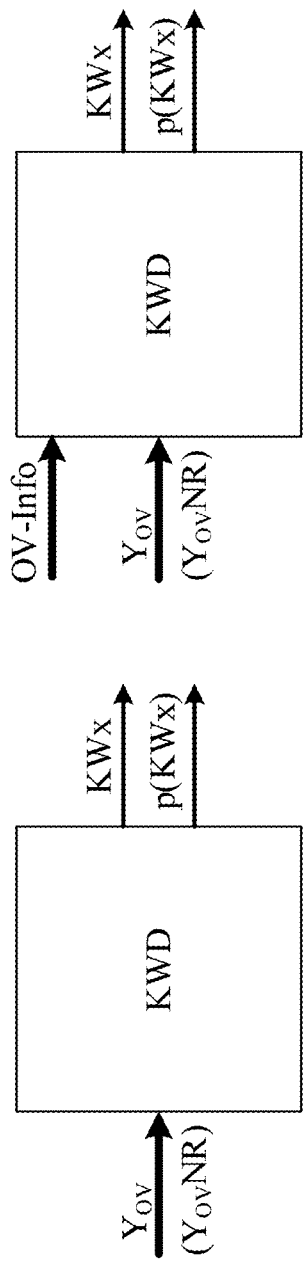
FIG. 6C
FIG. 6D

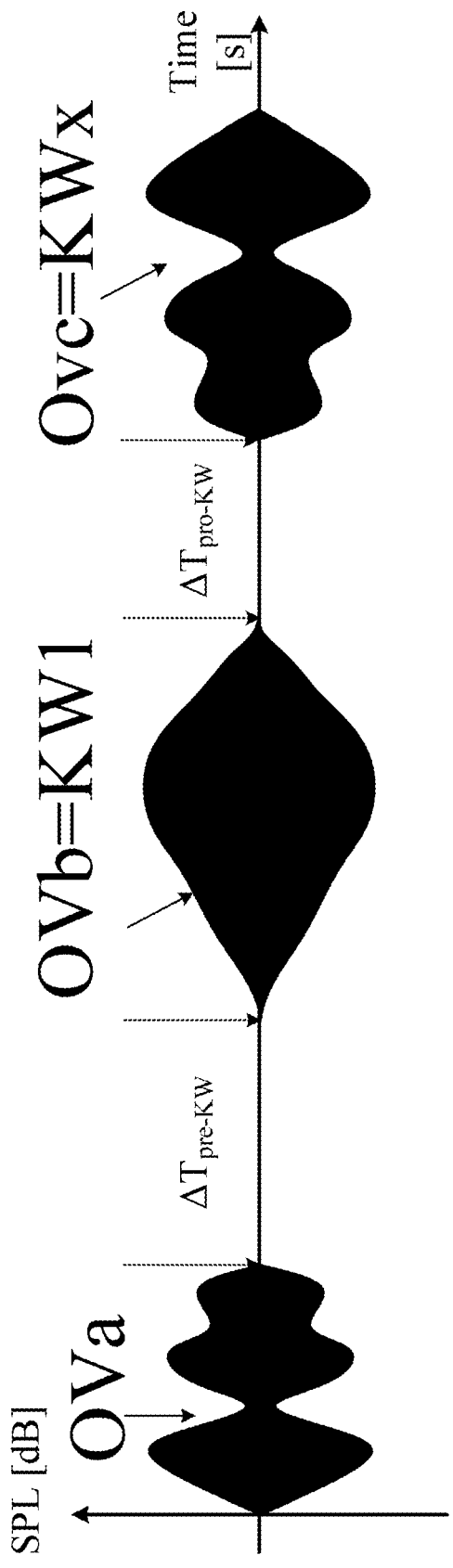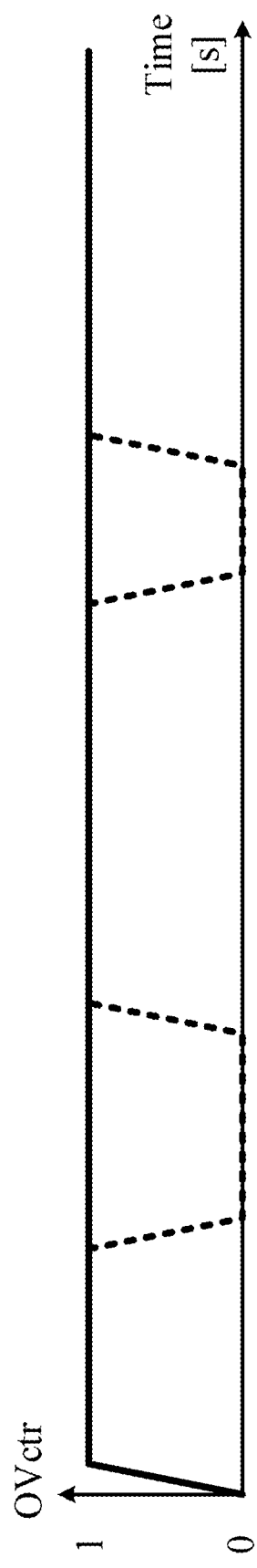
FIG. 7B
FIG. 7C ature patent page

HEARING DEVICE COMPRISING A TRANSMITTER

This application is a Divisional of copending application Ser. No. 16/850,884, filed on Apr. 16, 2020, which claims priority under 35 U.S.C. § 119(a) to Application No. 19169789.5 filed in Europe on Apr. 17, 2019 and to Application No. 19210634.2 filed in Europe on Nov. 21, 2019, respectively, all of the aforementioned applications being expressly incorporated by reference into the present application.

SUMMARY

The present disclosure relates to hearing devices, e.g. hearing aids, in particular to voice control of a hearing device. The present disclosure also relates to a hearing device comprising a transmitter.

The functionality of a hearing device (or an associated device in communication with the hearing device) may be accessed (e.g. controlled) via a voice control interface. A voice control interface may be based on a keyword spotting system. A voice control interface may be enabled by a particular 'wake-word'. A spoken command for controlling a function (e.g. 'volume up') in the hearing device may consist of or comprise a wake-word followed by a command word. The command word may be required to follow immediately after the wake-word (with no other non-command words in between) or within a certain period of time after the wake-word has been detected (in case the wake-word enables the voice control interface for a certain period of time, so that you only have to speak the command word, when the voice control interface has been enabled).

Such a system can either run in a hearing device, or in an external device in communication with the hearing device, or in a combination of a hearing instrument system and an external device (e.g. wake-word detection in the hearing device and command word detection (and/or speech recognition in general) in an external device).

Due to its limited size and battery power, a hearing device (e.g. a hearing aid) has limited computational power compared to an external device. It would thus be advantageous to perform computationally heavy calculations in an external device. Such setup is e.g. illustrated in FIG. 10 comprising a binaural hearing system comprising first and second hearing devices (HD1, HD2) located at right and left ears of a user (U), the binaural hearing system being configured to establish communication to an external device (ExD), e.g. comprising a user interface (UI).

The hearing device(s) is/are typically connected to an external device via a wireless link (WL1, WL2 in FIG. 10). Calculations performed in an external device may thus require data transmission between the hearing device(s) and the external device. Data transmission such as transmission of an audio signal also drains the hearing device battery. For that reason, it may be of interest to detect when an audio signal should be transmitted to the external device (and to only transmit the audio signal when considered of interest to the application). This is illustrated in FIGS. 11A, 11B, 11C in various embodiments.

Voice control interfaces for controlling various devices are currently being widely deployed. Many of these interfaces are initiated when the user says a wake-word (or sentence) followed by command words or sentences. Examples include so-called virtual assistants, such as Siri, Alexa, (Google) Assistant, etc. These services are mostly executed on devices with many more computational resources (e.g., memory complexity, computational complexity, battery power, etc.) than available on hearing devices such as a hearing aid (HA) or a hearing (aid) system.

Nevertheless, it may be of interest to execute keyword spotting (KWS) algorithms, i.e., algorithms for detecting wake-words/command-words, locally in a hearing device or a hearing system. An aim of the present disclosure is to improve over existing solutions for KWS by incorporating information about the users' own voice (OV) activity in the KWS process. Wake-word detection may be activated or de-activated by the user via a user interface (e.g. in a specific mode of operation of the hearing device). Thereby power can be saved until the user wants the voice control interface to be 'activatable'. Alternatively or additionally, wake-word detection can be activated by the detection of OV-activity.

KWS in hearing devices (e.g. hearing aids) has a potential advantage over systems like Siri and Alexa, e.g. running on a smartphone: It may be easier to detect when the user speaks. This is so, because with HA systems, dedicated sensors or algorithms may be used for detecting own-voice activity. For HA systems, such sensors (see below) could be placed on the user and, hence, allow a more robust detection of the users' OV activity.

Combining OV information with a KWS system may lead to computational as well as performance advantages, as outlined below.

A KWS system with access to reliable information about OV activity may be computationally cheaper. In particular, the KWS system (which is generally computationally costly to execute) need only to be executed, whenever an OV detector judges that there is a reasonable probability of OV activity. Furthermore, if an OV detection mechanism is already available for other purposes or can easily be derived from algorithms that are executed anyway (as is the case for hearing aid systems), then the KWS system does not need to deal with OV detection in addition to KWS (i.e., a computational saving).

Furthermore, or in addition, when the KWS system is actually executed (i.e., when the OV detector judges that OV activity may be present with some probability), the OV information may be used to refine the output of the KWS-system. For example, if the KWS-system judges that a keyword was most likely spoken, but the OV activity detector judges that the probability of OV activity is low, then the final decision may be that the keyword was not spoken by the user, but perhaps by a competing speaker. Hence, combining OV information with the output of the KWS system could lead to performance improvements in terms of a reduced false positive rate.

An own voice indicator (e.g. an 'own voice flag') may be transmitted from the hearing device to an external device, e.g. for being further used or processed. An estimate of own voice may be useful information for an external device.

Keyword spotting: Several systems already exist for wake-word/keyword spotting, e.g., Siri, Alexa, Google Assistant, etc. It appears that these systems often do not perform an explicit voice-activity detection.

A may be always on and ready for detection of one of a limited number of keywords KWx, x=1, . . . , Q, where Q may be of the order of 2-100, e.g. between 2 and 20, e.g. between 5 and 15. A may however also be normally in a low power 'sleep' mode (or off), and only activated (awakened) by a specific wake-word, e.g. only when spoken by the user wearing the hearing device (or optionally only by a particular user to whom the hearing device is adapted). In the present application, the specific wake-word is denoted KW1. The comprises a keyword spotting system configured to detect whether or not, or with what probability, a particular keyword KWx is present in a current audio stream presented to the keyword spotting system. The wake-word may be detected by a specific wake-word detector (e.g. located in the hearing device), and the rest of the Q−1 keywords may be detected by a separate keyword spotting system (e.g. located in the hearing device or in another device). Alternatively, the wake-word may be detected by the same keyword spotting system that detects the other Q−1 other keywords (e.g. located in the hearing device or in another, e.g. external, device). The wake-word (or phrase) should preferably be chosen to be one or more (such as all) of a) unique (not frequently used in ordinary conversation); b) relatively long (to provide some variety in its characteristics), but not too long (to not impose unnecessary processing); international (to simplify manufacturing); 4) be recognizable in noisy environments.

Users' own voice detection: Mostly, general voice activity detection algorithms are used for OV detection in HA systems. These are often modulation-based, but several other principles exist, e.g., [1, 2, 3]. Other, and potentially better, methods for OV activity detection could be envisioned (see below).

The detection of OV may as well be used to extract an audio sequence (e.g. spoken by the user) which is further processed with the purpose of KWS. The sequence may e.g. either be processed locally (in the hearing device) or transmitted to an auxiliary (e.g. external) device for further processing. Under the (exemplary) assumption that a keyword only occurs in the beginning of an OV-sequence, only the first part (e.g. less than 1-2 seconds) of an OV-audio sequence need to be further processed for KWS. A keyword may thus only be accepted as a valid keyword, if the user's own voice has NOT been present for a first predefined time period preceding the keyword, AND if the user's voice is active while the keyword is being spoken.

Combining Keyword spotting with Users' own voice detection: US20190075406A1 and our co-pending European patent application EP18179374.6, filed on 22 Jun. 2018, mentions the idea of using an own voice beamformer/ detector in a hearing device to identify a keyword and thereby e.g. activate a.

A First Hearing Device:

In an aspect of the present application, a hearing device, e.g. a hearing aid, configured to be arranged at least partly on a user's head or at least partly implanted in a user's head is provided. The hearing device comprises at least one input transducer for picking up an input sound signal from the environment and providing at least one electric input signal representing said input sound signal;

a signal processor connected to the at least one input transducer, the signal processor being configured to analyze the electric input signal and to provide a transmit control signal in dependence thereof.

The hearing device may further comprise a memory buffer, e.g. a cyclic buffer, for storing a current time segment of a certain duration of said at least one electric input signal, or a processed version thereof;

a transmitter for transmitting at least a part of said time segment of the electric input signal to another device in dependence of said transmit control signal.

The hearing device may comprise a voice control interface.

The signal processor may comprise an own voice detector connected to the at least one input transducer. The own voice detector being configured to provide an own voice indicator estimating whether or not, or with what probability, a given input sound signal, e.g. said at least one electric input signal, originates from the voice of the user of the hearing device. The signal processor may comprise a controller configured to provide the transmit control signal in dependence of the own-voice indicator. The signal processor may e.g. be configured to transmit a part of the current data stored in the memory buffer to the external device, such part of the data starting a (e.g. pre-defined) start-time period (e.g. ≤100 ms) prior to own voice detection. Likewise, the signal processor may e.g. be configured to stop transmission of the data from the memory buffer after a (e.g. predefined) stop-time period. The transmit period may thus be limited to a (e.g. pre-defined) duration of time (e.g. depending on the expected length of the keyword or wake-word or sentence in question), e.g. ≤five seconds, e.g. ≤two seconds; e.g. ≤one second.

The signal processor may comprise a keyword detector (e.g. a wake-word detector) e.g. as described in connection with the aspect of the 'second' hearing device below. The wake-word detector may e.g. be implemented by a relatively simple (low-power) wake-word detection algorithm. In combination with own-voice detection and a linguistically easy to detect wake-word or sentence, such wake-word detector may provide an acceptable confidence level. The external device may, however, be configured to also detect the wake-word based on the data from the user transmitted to the external device (e.g. during own voice detection) as described above in connection with first aspect. The limited number of predefined keywords may e.g. be one or two, e.g. corresponding to a wake-word or phrase, e.g. of a voice control interface or any other function of the hearing device or an external device or system. The hearing device, e.g. the keyword spotting system, may be configured to provide that a keyword, e.g. a specific wake-word, can only be accepted as a valid keyword (e.g. wake-word), if the user's own voice has NOT been detected by the own voice detector for a first predefined threshold time period preceding the detection of the keyword. The hearing device, e.g. the keyword spotting system, may be configured to provide that a keyword, e.g. a specific wake-word, can only be accepted as a valid keyword (e.g. wake-word), if the user's own voice has NOT been detected by the own voice detector for a first predefined threshold time period preceding the detection of the key-word by the keyword detector, AND if the user's own voice IS detected by the own voice detector while the keyword is detected by the keyword detector. In other words, the hearing device, e.g. the keyword spotting system, may be configured to provide that the keyword is only accepted as a valid keyword, if a) the own-voice indicator indicates that the user's own voice has NOT been detected for a first predefined time period preceding the keyword, AND b) that the own-voice indicator indicates that the user's own voice is detected while the keyword indicator indicates that said keyword is detected.

As described in connection with the second aspect, the keyword detector (e.g. a wake-word detector) and/or the own voice detector may be implemented by an algorithm based on supervised learning, e.g. a trained (e.g. deep) neural network. An input vector to the neural network may comprise the at least one electric input signal, e.g. a number of time-frames thereof. An input vector to the neural network may additionally comprise an own voice control signal indicative of the presence of the user's voice in the at least one electric input signal, e.g. in said number of time-frames thereof. An output vector of the neural network may e.g. comprise a detected keyword and/or a probability of the detection of the keyword (e.g. a probability of the detection of any of the keywords that the keyword spotting system is designed to know). The output vector of the neural network may e.g. comprise a probability of the detection of any of the keywords that the keyword spotting system is designed to know spoken by the user of the hearing device. The neural network may be configured to provide that a keyword, e.g. a specific wake-word, can only be accepted as a valid keyword (e.g. wake-word), if the user's own voice has NOT been present for a first predefined threshold time period preceding the keyword, AND if the user's voice is active while the keyword is being spoken.

The signal processor may e.g. be configured to apply a processing algorithm (e.g. to apply a frequency dependent gain to the at least one electric input signal or a signal derived therefrom, e.g. to compensate for a hearing impairment of the user) and providing a processed signal based on one or more of said at least one electric input signals (or signal(s) derived therefrom). The hearing device may further comprise an output unit for converting said processed signal or a signal originating therefrom to stimuli perceivable by said user as sound.

The hearing device may further comprise a keyword spotting system comprising a keyword detector configured to detect a limited number of predefined keywords or phrases or sounds in said at least one electric input signal or in a signal derived therefrom, and to provide a keyword indicator of whether or not, or with what probability, a given keyword or phrase or sound is detected. The keyword spotting system may be configured to detect a wake-word or phrase for a specific application, e.g. for activating a of the hearing device, and/or of another device.

The keyword spotting system may be configured to provide the keyword indicator, as well as the corresponding keyword (e.g. a wake-word or sentence, or a command word or sentence).

It is intended that some or all of the structural features of the second hearing device described below, in the 'detailed description of embodiments' or in the claims can be combined with embodiments of the first hearing device.

A First Method of Operating a Hearing Device:

In an aspect of the present application, a (first) method of operating a hearing device, e.g. a hearing aid, configured to be arranged at least partly on a user's head or at least partly implanted in a user's head is provided. The method comprises providing at least one electric input signal representing an input sound signal;

analyzing the at least one electric input signal and providing a transmit control signal in dependence thereof;

sequentially storing a current time segment of a certain duration of said at least one electric input signal, or a processed version thereof;

transmitting at least a part of said time segment of the electric input signal to another device in dependence of said transmit control signal.

It is intended that some or all of the structural features of the first or second hearing device described above or below, in the 'detailed description of embodiments' or in the claims can be combined with embodiments of the method, when appropriately substituted by a corresponding process and vice versa. Embodiments of the first method have the same advantages as the corresponding devices.

The transmit control signal may depend on the detection of own voice. The transmit control signal during a phone conversation may depend on whether the far-end talker is or is not talking.

The transmit control signal may depend on the detection of a keyword, e.g. a wake-word. The method may provide that a keyword, e.g. the wake-word, is only accepted as a valid keyword, if the user's own voice has NOT been detected by the own voice detector for a first predefined threshold time period preceding the detection of the keyword.

The further analysis by an external device may be designed to work optimally when the processing is based on the local microphones of the external device. It is thus advantageous if the frequency response of the hearing device (e.g. the microphone(s) of the hearing device) is calibrated to have the same response (or characteristics) as the response of the microphone(s) in the external device. The correction may either be implemented in the hearing device or in the external device (cf. e.g. FIGS. 12A, 12B, respectively).

A Second Hearing Device:

In a further aspect of the present application, a hearing device, e.g. a hearing aid, configured to be arranged at least partly on a user's head or at least partly implanted in a user's head is provided.

The hearing device may comprise at least one input transducer for picking up an input sound signal from the environment and providing at least one electric input signal representing said input sound signal;

a signal processor providing a processed signal based on one or more of said at least one electric input signals;

an output unit for converting said processed signal or a signal originating therefrom to stimuli perceivable by said user as sound; and a keyword spotting system.

The keyword spotting system may comprise a keyword detector configured to detect a limited number of predefined keywords or phrases or sounds in said at least one electric input signal or in a signal derived therefrom, a controller configured to provide an own-voice-keyword indicator of whether or not or with what probability a given one of said keywords or phrases or sounds is currently detected and spoken by said user.

The keyword spotting system may comprise a keyword detector configured to detect a limited number of predefined keywords or phrases or sounds in said at least one electric input signal or in a signal derived therefrom, and to provide a keyword indicator of whether or not, or with what probability, said keywords or phrases or sounds are detected, an own voice detector for providing an own voice indicator estimating whether or not, or with what probability, a given input sound signal originates from the voice of the user of the hearing device.

The hearing device may further comprise a controller configured to provide an own-voice-keyword indicator of whether or not or with what probability a given one of said keywords or phrases or sounds is currently detected and spoken by said user, said own-voice-keyword indicator being dependent on said keyword indicator and said own voice indicator.

Thereby an improved of a hearing device may be provided.

The terms '<x> indicator', x='keyword', 'own voice', 'own-voice-keyword', are in the present application intended to mean or be equivalent to the terms 'first, second and third indicators', respectively (e.g. to make a reference to a particular 'indicator' easier understand).

The own-voice indicator may provide an estimate of a probability that a given input sound signal originates from the voice of the user of the hearing device (probabilistic indication [0, 1]). The key word indicator may provide an estimate of a probability that a given one of said keywords or phrases or sounds is detected in given input sound signal (probabilistic indication [0, 1]). The own-voice indicator may provide a (binary, e.g. 1 or 0) estimate of whether (1) or not (0) a given input sound signal originates from the voice of the user of the hearing device. The key word indicator may provide a (binary, e.g. 1 or 0) estimate of whether (1) or not (0) a given one of said keywords or phrases or sounds is detected in given input sound signal. The own-voice indicator and the key word indicator may both be probabilistic. The own-voice indicator and the key word indicator may both binary. The own-voice indicator may be probabilistic, and the key word indicator may be binary. The own-voice indicator may be binary, and the key word indicator may be probabilistic.

The own-voice-keyword indicator may e.g. be equal to or dependent on a product of the own-voice indicator and the keyword indicator.

The keyword spotting system may be configured to provide the keyword indicator, as well as the corresponding keyword (e.g. a wake-word or sentence, or a command word or sentence).

In an embodiment, the keyword detector is (at least in a particular mode of operation) 'always on' (ready to look for predefined keywords (and/or a particular wake-word) in the input signal). The controller may, however, be configured to activate the keyword spotting system or a part thereof only when the user's voice is detected by the own voice detector or is detected with a probability larger than a threshold value. Thereby the own voice detector is used to increase a probability that a detected keyword is actually spoken by the user. Additionally, power consumption by the keyword spotting system is conserved.

In the present context, the term 'keyword' (or sentence) is used in general for pre-defined words that are intended to be recognized by the keyword spotting system (e.g. by the key-word detector), e.g. forming part of a voice control interface. The term 'keyword' (or sentence) is intended to include a particular (pre-defined) 'wake-word' (or sentence) as well as other predefined words (or sentences), the latter being termed 'command words' (or sentences). In an embodiment, the term 'keyword' (or sentence) is intended to mean a 'wake-word' (or sentence) and a limited number of 'command words' (or sentences), e.g. for use by a voice control interface of the hearing device.

The hearing device may comprise a memory buffer, e.g. a cyclic buffer, for storing a current time segment of a certain duration of said at least one electric input signal, or a processed version thereof. The memory buffer may e.g. allow a time segment of up to 5 s of audio (equal to or derived from the at least one electric input signal) to be (temporarily) stored, and e.g. transmitted to an external device in dependence of a transmit control signal.

The hearing device may comprise a transmitter for transmitting said at least one electric input signal, or a processed version, e.g. a time segment, thereof to another device or system.

The hearing device may comprise a signal processor connected to the at least one input transducer and configured to analyze the at least one electric input signal, or a signal derived therefrom, and to provide a transmit control signal for controlling said transmitter in dependence thereof. Thereby transmit power may be saved substantially compared to a continuous transmission, e.g. in case a part or all of the keyword spotting is performed in an external device (e.g. apart from detection of a wake-word). The transmit control signal may be determined in dependence of the own voice indicator, or of the own-voice-keyword indicator, or on the detection of a wake-word for a voice control interface of an external device or system in communication with the hearing device.

The hearing device may comprise an analysis filter bank to provide said at least one electric input signal in a time-frequency representation comprising a number of frequency sub-bands. In an embodiment, the hearing device comprises a multitude of analysis filter banks to provide a (possible) multitude of electric input signals in a time-frequency representation comprising a number of frequency sub-bands. The term 'time-frequency representation' refers to representation where a time-domain signal is represented in the frequency-domain as a number of frequency sub-band signals (or a map of consecutive frequency spectra (a spectrogram), each spectrum representing a time segment (e.g. a time frame) of the signal).

The hearing device may be specifically adapted to pick up the user's own voice. The hearing device may e.g. comprise a particular own-voice microphone, or a multitude of microphones coupled to an own-voice beamformer configured to focus on the user's mouth, to thereby provide an estimate of the user's voice (to ease the task of keyword spotting based on the user's voice). The provision of an estimate of the user's voice may form part of a pre-processing procedure for keyword detection. The hearing device may be configured to feed such estimate of the user's voice to the keyword detector.

The hearing device may comprise a multitude of input transducers for picking up an input sound signal from the environment and providing corresponding electric input signals (e.g. the at least one electric input signal). The hearing device may comprise a beamformer filtering unit configured to receive the electric input signals to provide a spatially filtered signal in dependence thereof. The hearing device may comprise a noise reduction system, e.g. a post filter or single channel noise reduction unit, for reducing noise (in addition to the spatial filtering performed by the beamformer filtering unit) and providing a spatially filtered (beamformed), noise reduced signal.

The hearing device may comprise a pre-defined and/or adaptively updated own voice beamformer focused on the user's mouth and configured to pick up the user's own voice. The own voice beamformer may be configured to provide a signal comprising an estimate of the user's own voice. The estimate of the user's own voice may be used as an input signal to the keyword spotting system.

The hearing device may comprise an analysis unit for analyzing a user's own voice and for identifying characteristics thereof. Characteristics of the user's own voice may e.g. comprise one or more of frequency spectrum, fundamental frequency, formant frequencies, level, speed of talking, etc.

The hearing device may comprise a number of detectors each providing a detector signal related to the user's own voice. The number of detectors may e.g. include a level detector, a bone-conduction detector (e.g. an accelerometer), a frequency analyzer, a language detector, etc. In an embodiment, the hearing device comprises a detector of whether or not the hearing device is currently being worn by the user. If this is clearly not the case, KWS is irrelevant and may be shut down (low power or sleep mode).

The hearing device may be configured so that the own voice beamformer, at least in a specific mode of operation of the hearing device, is activated and ready to provide an estimate of the user's own voice for transmission to another device during a telephone mode, or a voice command mode, or in other modes, where a user's own voice is requested.

The hearing device may comprise a voice (control) interface coupled to the keyword spotting system (or the keyword spotting system may for part of the voice control interface). The hearing device may be configured to allow a user to activate and/or deactivate one or more specific modes of operation of the hearing device via the voice control interface. The hearing device (e.g. the keyword spotting system) may be configured to activate (enable) a voice command mode via a wake-word. The voice command mode may thus be used to activate a number of modes of operation (including a telephone mode) and/or to control functionality of the hearing device (including volume control, hearing aid program control and possible other functionality typically handled by a remote control device). The voice command mode is configured to allow initiation of a communication with a cellular telephone, e.g. a smartphone, e.g. an APP of a smartphone, and/or a 'personal assistant' of a smartphone. In a particular 'Help mode' of the hearing device (e.g. activated via the voice control interface of the hearing device), the user's voice is transmitted to another device, e.g. a smartphone, and activates a 'personal assistant' of the other device (e.g. via an application programming interface (API) of the other device), e.g. to ask a question (normally enabled via a voice control interface in the other device). The outputs (questions, replies) from the personal assistant of the auxiliary device are forwarded to the hearing device (e.g. as audio picked up by the microphones of the hearing device or wirelessly as a direct electric signal, e.g. on an AUX-input of the hearing device) and fed to the output unit (e.g. a loudspeaker) and presented to the user perceivable as sound. Thereby the user's interaction with the personal assistant of the auxiliary device (e.g. a smartphone or a PC) can be fully based on (own) voice input and (audio) output (i.e. no need to look at a display or enter data via a keyboard).

The own voice detector may be adapted to be based on level differences between microphone signals, or based on modulation, detection of jaw movement, or bone vibration, or on a signal from a residual volume microphone (e.g. facing the eardrum).

The keyword spotting system may be configured to detect a limited number of keywords (or sentences), including a specific wake-word for activating the voice control interface. The keyword spotting system may be configured to detect a limited number of keywords (or sentences), including a number of predefined command words.

The keyword spotting system may comprise a neural network, e.g. a deep neural network. The neural network may be a trained neural network configured to provide that a keyword is only accepted as a valid keyword, if the user's own voice has NOT been present for a first time period preceding the keyword, AND if the user's voice is active while the keyword is being spoken.

The hearing device may be configured to provide that a keyword, e.g. a specific wake-word, can only be accepted as a valid keyword (e.g. wake-word), if the user's own voice has NOT been detected by the own voice detector for a first predefined threshold time period preceding the detection of the keyword. The time period when KWS is valid may be identified by own voice detection. This time period may e.g. start before OV is detected. A predefined keyword (e.g. a wake-word) may e.g. be required (or assumed) to be located in the beginning of a sentence. A (small) delay may be introduced in the keyword detection to allow the own voice detector to provide the own voice indicator of a current input signal before the keyword detector analyses the current input signal. This may e.g. be provided by storing a time segment of the at least one electric input signal or a processed version thereof in a buffer. Hence, the hearing device, e.g. the keyword spotting system, may be configured to provide that a keyword, e.g. a wake-word, among the limited number of predefined keywords can only be accepted as a valid keyword (e.g. a wake-word), if the own voice indicator, as reflected by the keyword indicator, indicates that the user's own voice has NOT been detected by the own voice detector for a first predefined threshold time period preceding the detection of the keyword.

The hearing device may be configured to provide that a keyword can only be accepted as a valid keyword, if the user's own voice has NOT been detected by the own voice detector for a second predefined threshold time period proceeding the detection of the keyword. Thereby a pause after the keyword (e.g. a wake-word) has been spoken is necessary to accept the keyword. In an embodiment, keyword comprises a wake-word (e.g. 'Wakeup Oticon') and a number of command words (e.g. 'Volume-down'). In an embodiment, the wake-word must precede a command word (e.g. 'Wakeup Oticon'-'Volume-down') to provide a valid command executed by the hearing device. A maximum (and possibly minimum) time period ($\Delta T_{WW-KW}$) may be required between the wake-word and the command-word for the voice control interface to accept and execute the command represented by the command word.

In an embodiment, the hearing device, e.g. the keyword spotting system, is configured to provide that the first and/or said second predefined threshold time periods is/are larger than or equal to 0.5 second, or larger than or equal to 1 second, or larger than or equal to 2 seconds. The time period ($\Delta T_{WW-KW}$) between a detected wake-word and an expected command word may be required to be smaller than 2 s, such as smaller than 1 s (to be accepted by the keyword spotting system).

An input vector to the neural network may comprise a time segment of the at least one electric input signal or a signal derived therefrom. The input vector may further comprise the own voice indicator from the own voice detector estimating whether or not, or with what probability, the time segment of the at least one electric input signal or a signal derived therefrom originates from the voice of the user of the hearing device. The length of the time segment (cf. 'context' of FIG. 3B) represented by the input vector may be adapted to the keyword or key phrase in question (e.g. in a range between 50 ms and 2 s), e.g. chosen long enough to cover the chosen keyword or key phrase, but not much longer to limit computational complexity (power consumption).

An output vector from the neural network may comprise (e.g. an indication of a detected one of) the limited number of keywords and/or current values of a probability that the possible keywords occur in the current input vector. The output vector may comprise a dedicated probability that none of the limited number of keywords spoken by the user were identified in the current input vector. The output vector may comprise a dedicated own voice speech presence probability.

The keyword spotting system may comprise a wake-word detector and a command word detector. The keyword detector (of the keyword spotting system) may comprise separate wake-word and command word detectors (see e.g. FIG. 9). The wake-word detector may be configured to detect a specific wake-word for the voice control interface (and in practice possibly for the command word detector), so that when the wake-word spoken by the user is detected, the command word detector is activated so that it is ready for identifying the (other) predetermined keywords (command words). The wake-word and command word detectors may be located in physically separated parts of the hearing device. The wake-word detector may (preferably) be located in the hearing device. The command word detector may be fully or partially located in a separate device in communication with the hearing device, e.g. in a cellular telephone, e.g. a smartphone, or other wearable stationary device. The wake-word detector may be active while the command word detector is inactive. The activation of the command word detector may be dependent on the detection of a wake-word by the wake-word detector.

The hearing device may be constituted by or comprise a hearing aid, a headset, an earphone, an active ear protection device or a combination thereof.

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processor for enhancing the input signals and providing a processed output signal.

In an embodiment, the hearing device comprises an output unit for providing a stimulus perceived by the user as an acoustic signal based on a processed electric signal. In an embodiment, the output unit comprises a number of electrodes of a cochlear implant (for a CI type hearing device) or a vibrator of a bone conducting hearing device. In an embodiment, the output unit comprises an output transducer. In an embodiment, the output transducer comprises a receiver (loudspeaker) for providing the stimulus as an acoustic signal to the user (e.g. in an acoustic (air conduction based) hearing device). In an embodiment, the output transducer comprises a vibrator for providing the stimulus as mechanical vibration of a skull bone to the user (e.g. in a bone-attached or bone-anchored hearing device).

The hearing device may comprise an input unit for providing an electric input signal representing sound. In an embodiment, the input unit comprises an input transducer, e.g. a microphone, for converting an input sound to an electric input signal. In an embodiment, the input unit comprises a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

In an embodiment, the hearing device comprises a directional microphone system adapted to spatially filter sounds from the environment, and thereby enhance a target acoustic source among a multitude of acoustic sources in the local environment of the user wearing the hearing device. In an embodiment, the directional system is adapted to detect (such as adaptively detect) from which direction a particular part of the microphone signal originates. This can be achieved in various different ways e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing device. In an embodiment, the direct electric input signal represents or comprises an audio signal and/or a control signal and/or an information signal. In an embodiment, the hearing device comprises demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. In an embodiment, the wireless link is established between two devices, e.g. between an entertainment device (e.g. a TV) and the hearing device, or between two hearing devices, e.g. via a third, intermediate device (e.g. a processing device, such as a remote control device, a smartphone, etc.). In an embodiment, the wireless link is used under power constraints, e.g. in that the hearing device is or comprises a portable (typically battery driven) device. In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

In an embodiment, the communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, e.g. less than 20 g.

The hearing device may comprise a forward or signal path between an input unit (e.g. an input transducer, such as a microphone or a microphone system and/or direct electric input (e.g. a wireless receiver)) and an output unit, e.g. an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at to by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 ρs, for $f_s$=20 kHz. In an embodiment, a number of audio samples are arranged in a time frame. In an embodiment, a time frame comprises 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the input unit, and or the antenna and transceiver circuitry comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

In an embodiment, one or more of the number of detectors operate(s) on the full band signal (time domain). In an embodiment, one or more of the number of detectors operate(s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-)threshold value. In an embodiment, the level detector operates on the full band signal (time domain). In an embodiment, the level detector operates on band split signals ((time-) frequency domain). Only voices with a certain range of levels may be relevant for KWS. The range of levels may depend on the background levels. The range of levels of interest for own voice detection may e.g. be integrated in the voice detector (own voice detector).

In a particular embodiment, the hearing device comprises a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for estimating whether or not (or with what probability) a given input sound (e.g. a voice, e.g. speech)

originates from the voice of the user of the system. In an embodiment, a microphone system of the hearing device is adapted to be able to differentiate between a user's own voice and another person's voice and possibly from NON-voice sounds. Own voice detection may also be used in connection with detection of other sounds such as coughing. Coughing may only be detected and possibly analyzed in time frames where own voice has been detected. Detection of coughing may be logged. An alarm or indication of a coughing frequency or time above a threshold may be issued, e.g. sent to an external device and/or presented on the external device, e.g. a smartphone or the like.

In an embodiment the hearing device comprises a detector capable of determining whether or not the hearing device is mounted at the ear. OVD and KWS are only necessary to run if the user is actually wearing the hearing device. Such a detector may be based on a feedback path estimate (cf. e.g. US20140321682A1 or US20150230036A1).

In an embodiment, the number of detectors comprises a movement detector, e.g. an acceleration sensor. In an embodiment, the movement detector is configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of
a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

The hearing device may comprise an acoustic (and/or mechanical) feedback suppression or echo-cancelling system. Feedback control (e.g. an update rate of the filter weights or an adaptation rate of the adaptive algorithm) may be performed in dependence of or influenced by one or more of the detector signals, e.g. the own voice detection signal.

In an embodiment, the hearing device further comprises other relevant functionality for the application in question, e.g. compression, noise reduction, etc.

In an embodiment, the hearing device comprises a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. In an embodiment, the hearing assistance system comprises a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. In an embodiment, use is provided in a system comprising audio distribution, e.g. a system comprising a microphone and a loudspeaker in sufficiently close proximity of each other to cause feedback from the loudspeaker to the microphone during operation by a user. In an embodiment, use is provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

Use in a binaural hearing system comprising left and right hearing devices according to the present disclosure and being capable of exchanging and comparing decisions regarding detected keywords may e.g. be provided. A binaural decision may e.g. be based on a logic criterion, e.g. 'left AND right' (both hearing devices have to come to the same decision of a given keyword for the binaural system, to accept it. Alternatively, a binaural decision may be based on a combination of the left and right probabilities, e.g. that $p(left)*p(right) \geq p(thr)$, where $p(thr)$ is a threshold value, e.g. $p(thr) \geq 0.6$).

A Second Method of Operating a Hearing Device:

In an aspect, a (second) method of operating a hearing device configured to be arranged at least partly on a user's head or at least partly implanted in a user's head is furthermore provided by the present application. The method comprises
picking up an input sound signal from the environment and providing at least one electric input signal representing said input sound signal;
providing a processed signal based on one or more of said at least one electric input signals;
converting said processed signal or a signal originating therefrom to stimuli perceivable by said user as sound.

The method may comprise one or more of
detecting a limited number of predefined keywords or phrases or sounds in said at least one electric input signal or in a signal derived therefrom, and to providing a keyword indicator of whether or not, or with what probability, said keywords or phrases or sounds are detected,
providing an own voice indicator estimating whether or not, or with what probability, a given input sound signal originates from the voice of the user of the hearing device; and
providing an own-voice-keyword indicator of whether or not or with what probability a given one of said keywords or phrases or sounds is currently detected and spoken by said user, said own-voice-keyword indicator being dependent on said keyword indicator and said own voice indicator.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

In an embodiment, the hearing system is adapted to establish a communication link between the hearing device and the auxiliary device to provide that information (e.g. control and status signals, possibly audio signals) can be exchanged or forwarded from one to the other.

In an embodiment, the auxiliary device comprises a remote control, a smartphone, or other portable or wearable electronic device, such as a smartwatch or the like.

In an embodiment, the auxiliary device is or comprises a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may do parts of the processing (the partition may e.g. be that OVD and a few keywords of relevance to the function of the hearing device (including a wake-word for the voice control interface) are detected in the hearing device, whereas further keywords are detected in the auxiliary device).

In an embodiment, the auxiliary device is or comprises another hearing device. In an embodiment, the hearing system comprises two hearing devices adapted to implement a binaural hearing system, e.g. a binaural hearing aid system. In an embodiment, there is thereby provided a binaural hearing system comprising first and second hearing devices as described above, in the 'detailed description of embodiments', and in the claims, wherein each of the first and second hearing devices comprises antenna and transceiver circuitry allowing a communication link between them to be established. A binaural hearing system comprising left and right hearing devices capable of exchanging and comparing decisions regarding detected keywords may e.g. be provided. A binaural decision may e.g. be based on a logic criterion, e.g. 'left AND right' (both hearing devices have to come to the same decision of a given keyword for the binaural system, to accept it. Alternatively, a binaural decision may be based on a combination of the left and right probabilities, e.g. that $F(p(\text{left}), p(\text{right})) \geq p(\text{thr})$, where $p(\text{thr})$ is a threshold value, e.g. $p(\text{thr}) \geq 0.6$, and F is a function of the probabilities, such as multiplication, MIN or MAX.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

The user interface process may comprise:
exchanging information with the hearing device or with the binaural hearing system;
providing a graphical interface configured to allow a user to calibrate an own voice detector of the hearing device or of the binaural hearing system; and
executing, based on input from a user via the user interface, at least one of:
configuring the keyword spotting system; and
initiating a calibration of the own voice detector;
initiating a, possibly further, training of the keyword detector.
Setting a time period for non-own voice detection preceding detection of a keyword.

A Wake-Word Detector or a Method of Detecting a Wake-Word:

In a further aspect, a wake-word detector is furthermore provided by the present disclosure. The detector is configured to detect a wake-word intended for activating a voice control interface and/or for activating a specific function of a device in communication with the wake-word detector (e.g. a device, which the wake-word detector form part of). The wake-word detector may be configured to only enable detection of a wake-word in a time window initiated by a period of non-own voice detection and (immediately) followed by a time period of own voice detection. The wake-word detector may be configured to only accept a wake-word as a valid wake-word, if the user's own voice has NOT been detected by the own voice detector for a first predefined threshold time period preceding the detection of the wake-word.

The wake-word detector may be configured to only enable detection of a wake-word in a time window initiated by a period of non-own voice detection (immediately) followed by a period of own-voice detection.

The voice control interface may form part of a portable (e.g. wearable) electronic device, e.g. a hearing device, such as a hearing aid or a headset.

The wake-word detector may comprise a neural network, e.g. a deep neural network. An input feature vector to the neural network at a given point in time may overlap (in time) with the (immediately) preceding input vector.

As a wake-word typically is spoken in the beginning of a sentence, a criterion regarding the timing of detection of a user's own voice may advantageously be introduced. Further, the wake-word detector may be configured to—when wake-word detection has been enabled—only be enabled for a specific time period (e.g. the first few seconds of a sentence). A time segment of the current input data (representing said input sound signal, e.g. the at least one electric input signal), e.g. the last 2 s, may e.g. continuously be stored in a buffer (e.g. a cyclic buffer). The data currently stored may e.g. be analyzed by the wake-word detector in dependence of a predefined criterion. The predefined criterion may e.g. comprise that the own voice detector indicates that own voice is present (e.g. with a probability larger than a threshold value, e.g. larger than 50% or larger than 60%) AND that the one or more timing constraints regarding own voice detection is/are fulfilled. Upon fulfilment of the predefined criterion, the currently stored data representing said input sound signal may e.g. be transmitted to another device for further processing (e.g. own voice detection, wake-word detection command word detection, etc.) or use. The currently stored data may be transmitted starting 100 ms prior to own voice detection as indicated by the own voice detector.

Thus, the wake-word detector may be configured to only enable detection of a wake-word in a time window initiated by a period of non-own voice detection followed by a period of own-voice detection. The wake-word detector may be configured to disable detection of a wake-word after a certain duration of own voice detection, e.g. ≤1 s, or ≤2 s or ≤5 s (in other words to only have wake-word detection enabled in a certain, e.g. predefined time window). This is illustrated in FIGS. 5C, 5D.

Definitions

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). In an embodiment, the hearing device comprises a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system) and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications comprising head-worn listening devices, such as hearing aids, earphones or headsets.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 3D illustrates a first embodiment of a training procedure for a keyword detector comprising a neural network in the keyword spotting system of FIG. 3C, and FIG. 3E illustrates a second embodiment of a training procedure for a keyword detector comprising a neural network in the keyword spotting system of FIG. 3C.

FIG. 5A shows a first exemplary speech waveform comprising a keyword for a keyword spotting system of a hearing device according to the present disclosure;

FIG. 5B shows a second exemplary speech waveform comprising a keyword for a keyword spotting system of a hearing device according to the present disclosure;

FIG. 6A shows first exemplary inputs and outputs of a keyword detector according to the present disclosure;

FIG. 6B shows second exemplary inputs and outputs of a keyword detector according to the present disclosure;

FIG. 6C shows third exemplary inputs and outputs of a keyword detector according to the present disclosure; and FIG. 6D shows fourth exemplary inputs and outputs of a keyword detector according to the present disclosure.

FIG. 7B shows an exemplary speech waveform comprising a keyword for the voice control interface according to the present disclosure; and FIG. 7C shows a control output from the own voice detector of FIG. 7A corresponding to the speech waveform of FIG. 7B.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids, in particular to a hearing device or system comprising a voice control interface for controlling functionality of the hearing device or system and/or for controlling functionality of other devices or systems (via the hearing device or system, and possibly via a network and/or a wireless communication interface).

Figure 1:
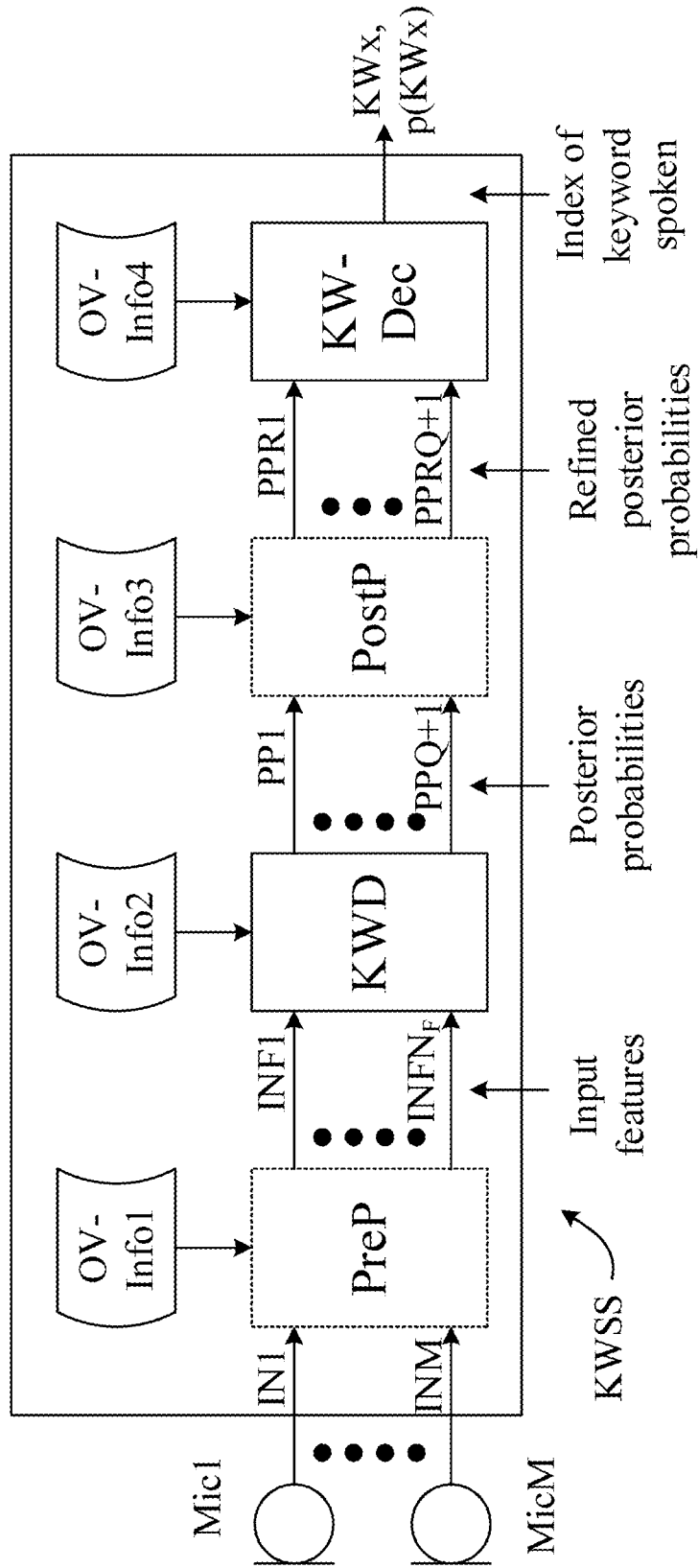
FIG. 1 schematically shows an embodiment of a keyword spotting system according to the present disclosure.

In an embodiment, a hearing aid system equipped with one or more microphones, and which performs keyword spotting according to the block diagram in FIG. 1, is provided. FIG. 1 schematically illustrates a keyword spotting system that uses information about a users' own voice, and which may be integrated in a hearing device according to the present disclosure. Only blocks that are relevant for the KWS task are shown. Other functional blocks may be present, e.g. related to noise reduction, hearing loss compensation, feedback control or compensation.

The blocks in the diagram of FIG. 1 'PreP' (pre-processing), 'KWD' (keyword detection), 'PostP' (post-processing) and 'Dec' (decision), and the arrows named 'OV-info1-OV-Info4' encompass several potential operations, as outlined in the following. One or more of the blocks are optional (e.g. PreP and PostP, cf. dotted outline), i.e., can be left out. In other words, the diagram describes a range of embodiments of the system.

The keyword spotting system (KWSS) may be configured to (fully or partially) form part of a hearing device. The hearing device is adapted to be located at or in an ear of the user, or to be partially of fully implanted in the head at an ear of the user. In general, the keyword detection system receives one or more electric input signals representing sound in the environment of a hearing device comprising the keyword spotting system (e.g. from one or more microphones). The embodiment of a keyword spotting system (KWSS) of FIG. 1 comprises M microphones, M≥2, each being configured to pick up an acoustic signal which may or may not contain a keyword spoken by the user. The overall purpose of the system is to detect if a keyword (or sentence) was spoken by the user at a particular point in time, and, if so, to decide which keyword (from a pre-determined, fixed list) was spoken. Alternatively, the system may be configured to detect a keyword (or sentence), e.g. from a pre-determined, fixed group of keywords, and to decide whether or not the keyword detected at a particular point in time was spoken by the user. In an embodiment, the keyword detector is configured to detect a specific wake-word or sentence of a voice control interface of the hearing device. In an embodiment, the keyword detector is configured to detect whether or not, or with what probability, the specific wake-word or sentence of the voice control interface of the hearing device was spoken by the user of the hearing device.

Pre-Processing (PreP):

In FIG. 1, the M microphones (Mic1, . . . , MicM) provide M electric input signals (IN1, . . . , INM) to the pre-processing block (PreP). The pre-processing block may comprise analysis filter banks, which decompose each microphone signal into frequency bands (e.g. K frequency sub-band signals), see e.g. FIGS. 2A, 2B. The analysis filter banks may be implemented in terms of short-time Fourier transform (STFT). The signal in each frequency band may be converted into temporal envelope signals, e.g., by computing the magnitude of the (complex-valued) STFT coefficients, or via the Hilbert transform of the sub-band signal. The envelope signals may be compressed using a log-transform (or any other compressive function). Subsequently, a Fourier transform may be applied to the compressed envelope signals to compute quantities akin to mel-frequency cepstral coefficients (MFCCs). The signals may be subsampled (down-sampled), or specific frequency bands may be selected, or frequency warping may be used, etc., at any stage in order to reduce the data rate fed into the following stages of the system.

Figure 2A:
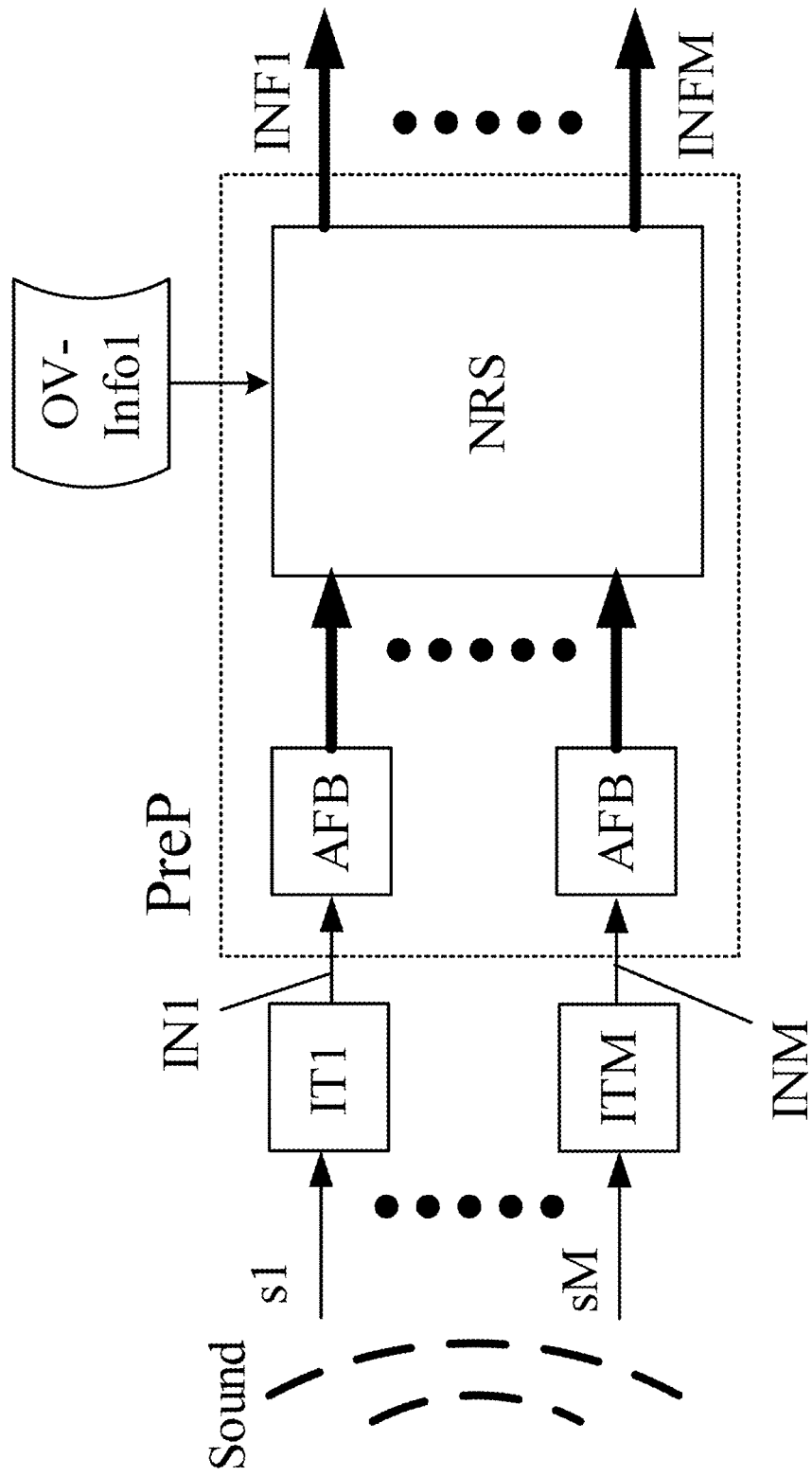
FIG. 2A shows a first embodiment of a pre-processing unit according to the present disclosure.
Figure 2B:
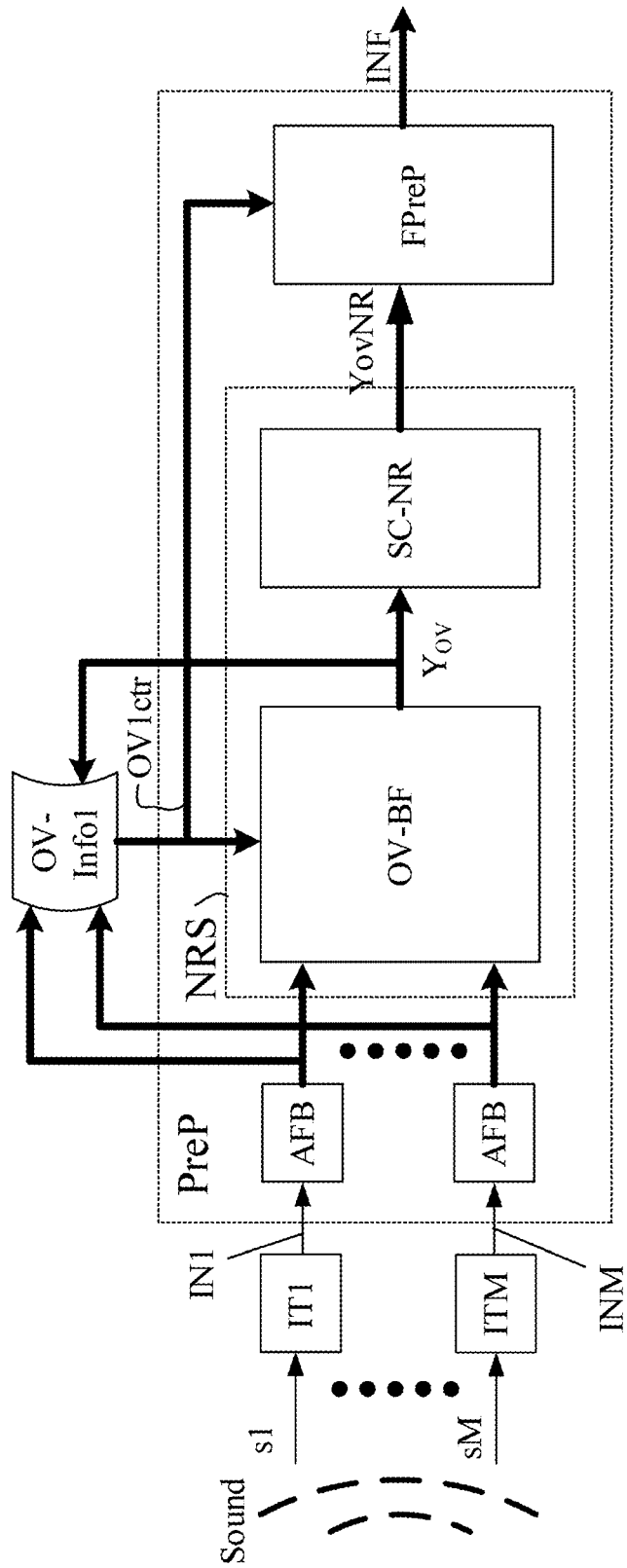
FIG. 2B shows a second embodiment of a pre-processing unit according to the present disclosure.

As illustrated in FIGS. 2A, 2B, the signals (in any of the representations above) may be passed through a noise reduction system (NRS) to reduce the impact of environmental noise. Signals may also be captured by a dedicated own-voice beamforming system, or any other system dedicated to retrieving the users' own voice, cf. e.g. FIG. 2B. In particular, a minimum variance distortion-less response (MVDR, or MVDR plus postfilter) own-voice beamformer has the advantage—besides the fact that the signal to noise ratio has been improved—that the own voice is undistorted whereas the frequency shape of the noise generally has changed. This makes it easier for the system to distinguish between own voice and background noise. The pre-processing stage (as well as individual sub-units of the pre-processing stage) is optional (cf. its dotted outline in FIG. 1)—in other words, a system exists, where the output of the pre-processing stage simply consists of the microphone signal(s) (IN1, ..., INM) entering the pre-processing stage (PreP).

OV information (e.g. own voice detection) may be used at this stage (cf. OV-Info1 in FIGS. 1, 2A, 2B). If OV activity information indicates that the input sound is unlikely to be the users' own voice signal, the pre-processing (and the processing in all following blocks, cf. e.g. further pre-processing block (FPreP) in FIG. 2B) may be suspended (cf. signal OV1*ctr* from the OV-Info1 unit to the FPreP unit in FIG. 2B), in order to a) save computations, and b) potentially improve performance over systems that do not have access to OV information. The pre-processing unit (e.g. the further pre-processing block (FPreP) in FIG. 2B) may be configured to provide as an output a 'feature vector' (INF1, ..., INFN$_F$, where N$_F$ is the number of features) comprising either the noise reduced input signals, a beamformed signal or features extracted from such signals. The feature vector may comprise extracted features over a number of time frames (e.g. 10-100) of the electric input signal(s) (or a beamformed signal derived therefrom), cf. e.g. FIGS. 3A, 3B, or FIGS. 8A-8D. The time frames may represent spectra (e.g. complex values at a number of frequencies k) of an input signal at successive indices of time (m, time-frequency representation (k,m)). Alternatively, the time frames may comprise a number (e.g. 128) of (time-) samples (digitized amplitude vs. time) of an input signal (time domain representation).

FIG. 2A shows a first embodiment of a pre-processing unit (PreP) according to the present disclosure. FIG. 2A shows an input stage of a hearing device providing M electric inputs signals (IN1, ..., INM) to the pre-processing unit (PreP). The input stage comprises M input transducers (IT1, ..., ITM), e.g. microphones, each for converting respective sound signals (s1, ..., sM) of a sound field (Sound) to said electric input signals (IN1, ..., INM). The pre-processing unit (PreP) of FIG. 2A comprises M analysis filter banks (AFB) for converting respective electric input signals (IN1, ..., INM) to frequency sub-band signals, which are fed to a noise reduction system (NRS). The noise reduction system (NRS) is configured to reduce noise components in the frequency sub-band signals (IN1, ..., INM) and to provide noise reduced signals (INF1, ..., INFM) in dependence of the frequency sub-band signals (IN1, ..., INM) and own voice information (OV-Info1), e.g. an own voice detection signal (cf. e.g. OV1*ctr* in FIG. 2B).

FIG. 2B shows a second embodiment of a pre-processing unit according to the present disclosure. The embodiment of FIG. 2B has the same input stage of a hearing device as described in connection with FIG. 2A. The pre-processing unit (PreP) of FIG. 2B also comprises M analysis filter banks (AFB) as described in connection with FIG. 2A whose frequency domain sub-band signals are fed to a noise reduction system (NRS). The noise reduction system (NRS) comprises an own voice beamformer filter (OV-BF) providing a spatially filtered signal Y$_{OV}$ representing an estimate of the user's own voice. The own voice beamformer (OV-BF) may e.g. be implemented by a (trained) neural network. The signal Y$_{OV}$ is a linear or non-linear (e.g. neural network based) combination of the electric input signals (IN1, ..., INM), where the weights Wi, i=1, ..., M may be determined in advance of use. The input control signal OV1*ctr* may e.g.

containing such predetermined beamformer weights. In case the beamformer weights are adaptively determined, the control signal OV may e.g. comprise an output from a voice activity detector (e.g. an own voice detector), e.g. to allow an update of a noise estimate during speech pauses, and possibly an update of acoustic transfer functions from the target sound source (the user's mouth) to the microphones of the hearing device during the user's speech. The noise reduction system (NRS) further comprises a post filter (SC-NR) for further reducing noise in the spatially filtered signal Y$_{OV}$ comprising the user's voice and to provide a noise reduced estimate of the user's own voice Y$_{OV}$NR. The pre-processing unit (PreP) may (optionally) comprise a processing unit (FPreP) for further processing the noise reduced signal Y$_{OV}$NR, e.g. to extract characteristics thereof, e.g. cepstral coefficients or other spectral parameters, and to provide a final pre-processed signal INF (comprising input features of a time segment of the input sound signal, or the electric input signal(s) itself(themselves)).

FIGS. 2A and 2B illustrate exemplary embodiments of the pre-processing unit. Other functional blocks may be included instead of or in combination with the ones illustrated in FIGS. 2A and 2B. For example, other embodiments may comprise an own-voice beamformer (OV-BF) without a postfilter (SC-NR), or may comprise a noise reduction system without an own-voice beamformer (OV-BF), e.g. based on a single microphone, etc.

Keyword Spotting (KWS):

The keyword spotting unit, or keyword detector (KWD) takes as input the output of the pre-processing stage (PreP), feature vector (INF1, ..., INFN$_F$). Specifically, at a particular point in time, the input to the keyword detector consists of the output of the preprocessing stage covering a time duration of for example 600 ms (e.g., a number of time frames of the signal(s) in question). The duration is a design choice: it is chosen to be long enough to cover any keyword, keyword sequence, or sentence of interest (normally it is chosen in the range 50 ms-2000 ms). The keyword detector can be or comprise a deep neural network (DNN), e.g. consisting of feed-forward networks, convolutional networks (CNN), recurrent networks, or combinations thereof. An advantage of recurrent networks is that the number of input frames may be shorter, as the memory is built into the network structure. This is particularly relevant for a small size, low power device, such as a hearing device, e.g. a hearing aid. The output (PP1, ..., PPQ) of the keyword detector provides an estimate of the probability p that a particular keyword was spoken. The network output may be Q (or Q+1) dimensional, where Q denotes the number of keywords in the vocabulary of the system. In this case the output (PP1, ..., PPQ) represents the posterior probability that a particular keyword was spoken. The (optional) (Q+1)$^{th}$ output (PPQ+1) may e.g. represent the probability of own voice activity p(OV) (at a given point in time corresponding to the posterior probabilities (PP1, ..., PPQ)). The (optional) (Q+1)$^{th}$ output (PPQ+1) may e.g. represent 'no keyword' or 'filler'. Instead, one of the Q keyword classes may be allocated to a 'no keyword' or 'filler' indication.

The neural network is represented by a number of weight parameters (e.g. a weight matrix W). The weights in W are e.g. determined in an off-line training procedure, where weights are adjusted iteratively in order that the network output matches the correct output for the particular input, see e.g. [4] for methodologies for DNN training. OV detection may be calibrated during training procedure. Examples of training of a keyword spotting system comprising a keyword detector according to the present disclosure is shown in FIGS. 3D, 3E.

Figure 3A:
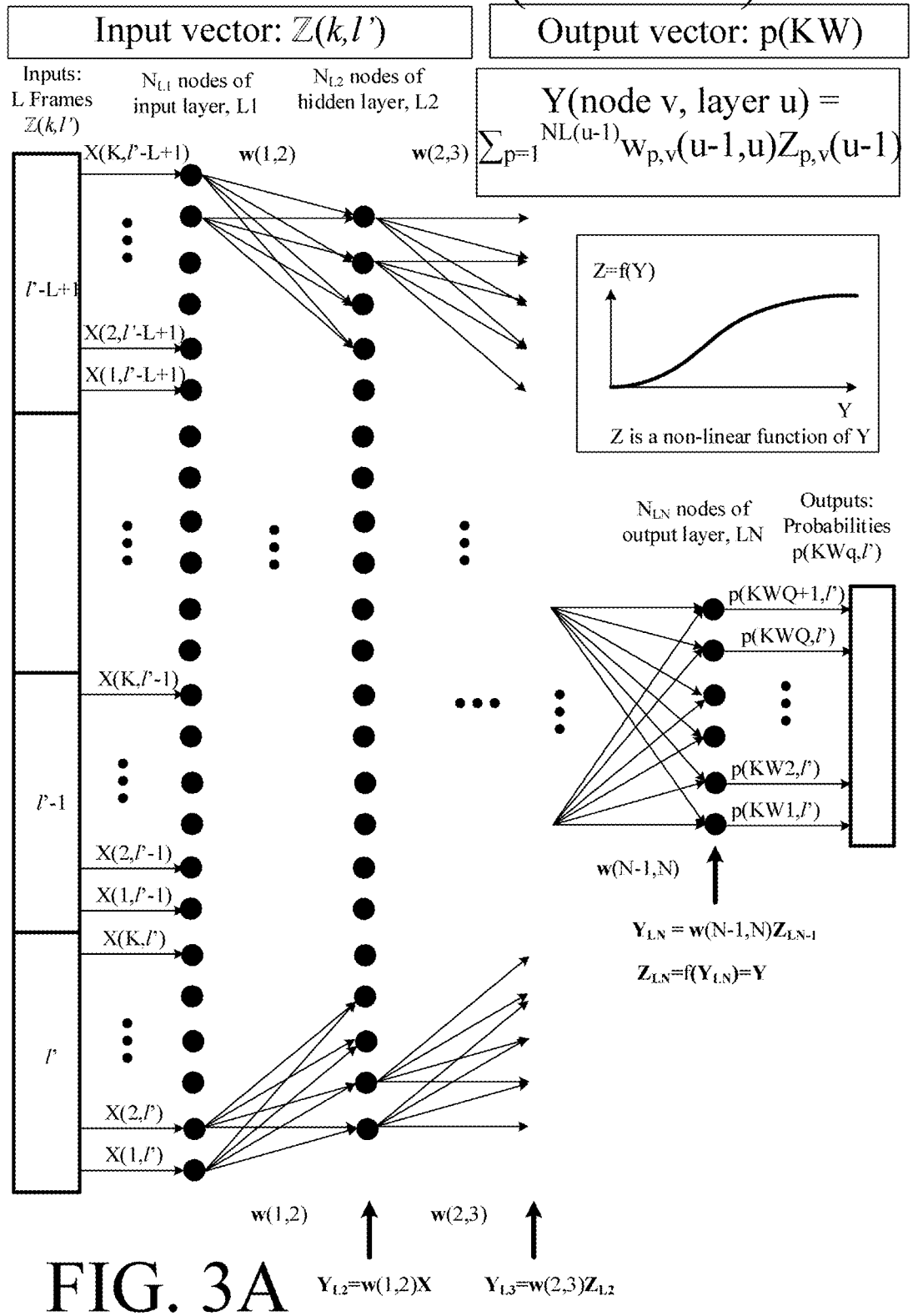
FIG. 3A shows an embodiment of a keyword spotting unit implemented as a neural network according to the present disclosure.

FIG. 3A shows an embodiment of a keyword spotting unit implemented as a neural network according to the present disclosure. FIG. 3A schematically illustrates a deep neural network(DNN, Ψ*) for determining a probability of the occurrence p(KWq,l) of a specific keyword KWq, q=1, . . . , Q+1, at a given point in time (l') from an input vector comprising a number L of time frames X(k,l), l=l'−(L−1), . . . , l', of an electric input signal or characteristic features thereof in a time-frequency representation (k,l), where k is a frequency index and l is a time (frame) index. The electric input signal or characteristic features (e.g. cepstral coefficients, or spectral characteristics, etc.) thereof at a current time l=l', termed 'Input features' and denoted INF1, . . . , INFN$_F$, where N$_F$ is the number of features, in FIG. 1, is denoted X(k,l') in FIGS. 3A, 3B. The L (last) time frames of the input signal INF(k,l) (X(k,l)), constituting the exemplary input vector to the neural network at a given point in time l=l', are denoted Z(k,l') in FIGS. 3A, 3B.

Figure 3B:
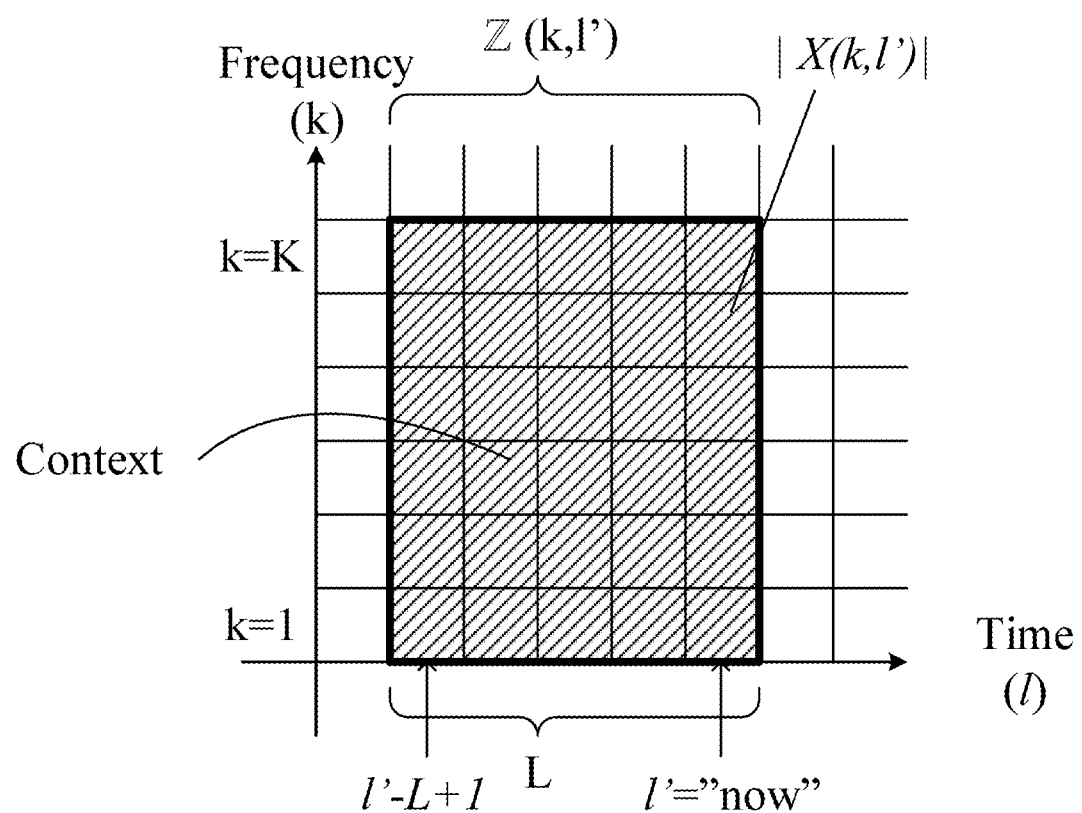
FIG. 3B shows the context of an electric input signal comprising audio used to generate an input vector for the neural network of FIG. 3A.

A present time frame (l') and a number L−1 of preceding time frames are stacked to a vector and used as input layer in a neural network (together denoted Z(k,l'), cf. also hatched time-frequency units denoted 'Context' in FIG. 3B. Each time frame X(k,l') comprises K (e.g. K=16 or K=24, or K=64 or K=128) values of an electric input signal (or features extracted therefrom), e.g. INF(k,l'), k=1, . . . , K in FIG. 2B. The signal may be represented by its magnitude |X(k,l')| (e.g. by ignoring its phase φ), cf. FIG. 3B. Alternatively, the input vector may comprise time samples of the input signal (time domain) covering an appropriate time segment. An appropriate number of time frames is related to the correlation inherent in speech. In an embodiment, the number L−1 of previous time frames, which are considered together with the present one l=l', may e.g. correspond to a time segment of duration of more than 20 ms, e.g. more than 50 ms, such as more than 100 ms, e.g. around 500 ms. In an embodiment, the number of time frames considered (=L) are larger than or equal to 4, e.g. larger than or equal to 10, such as larger than or equal to 24, e.g. in the range from 10-100. The width of the neural network is in the present application equal to K·L, which for K=64 and L=10 amounts to N$_{L1}$=640 nodes of the input layer L1 (representing a time segment of the audio input signal of 32 ms (for a sampling frequency of 20 kHz and a number of samples per frame of 64 and assuming non-overlapping time frames)). The number of nodes (N$_{L2}$, . . . , N$_{LN}$) in subsequent layers (L2, . . . , LN) may be larger or smaller than the number of nodes N$_{L1}$ of the input layer L1, and in general adapted to the application (in view of the available number of input data sets and the number of parameters to be estimated by the neural network). In the present case the number of nodes N$_{LN}$ in the output layer LN is Q+1 (e.g. ≤20, or 10 or less) in that it comprises Q+1 values of the probability estimator p(KWq,l') (q=1, . . . , Q+1), one value for each of Q keywords of the voice control interface and one (optional) value for detection of the user's own voice or for detection of a 'filler' (no keyword). In an embodiment, the neural network is fed with a new input feature vector every time a new timeframe of the input signal is provided by a filter bank of the hearing device. To reduce computational complexity (and power consumption), the frequency of executing the neural network is lower than once every timeframe, e.g. once every 10$^{th}$ time frame or lower than once every 20$^{th}$ time frame (e.g. less than once every 20 ms or less than once every 40 ms). Preferably the context (the input feature vector) fed to the neural network at a given point in time overlaps (in time) with the previous context. In an embodiment, the number of timeframes ΔL between each new execution of the neural network is smaller than the number of time frames L in the input feature vector (ΔL<L, e.g. ΔL/L≤0.5) to ensure context overlap).

FIG. 3A is intended to illustrate a general multi-layer neural network of any type, e.g. deep neural network, here embodied in a standard feed forward neural network. The depth of the neural network (the number of layers), denoted N in FIG. 3A, may be any number and typically adapted to the application in question (e.g. limited by a size and/or power supply capacity of the device in question, e.g. a portable device, such as a hearing aid). In an embodiment, the number of layers in the neural network is larger than or equal to two or three. In an embodiment, the number of layers in the neural network is smaller than or equal to ten, e.g. in the range from 2 to 8 or in the range from 2 to 6.

The nodes of the neural network illustrated in FIG. 3A is intended to implement standard functions of neural network to multiply the values of branches from preceding nodes to the node in question with weights associated with the respective branches and to add the contributions together to a summed value Y'$_{v,u}$ for node v in layer u. The summed value Y'$_{v,u}$ is subsequently subject to a non-liner function f, providing a resulting value Z$_{uv}$=f(Y'$_{v,u}$) for node v in layer u. This value is fed to the next layer (u+1) via the branches connecting node v in layer u with the nodes of layer u+1. In FIG. 3A the summed value Y'$_{v,u}$ for node v in layer u (i.e. before the application of the non-linear (activation) function to provide the resulting value for node v of layer u) is expressed as:

$$Y'_{v,u} = \sum_{p=1}^{N_L(u-1)} w_{p,v}(u-1, u) Z_p(u-1)$$

where w$_{p,v}$(u−1,u) denotes the weight for node p in layer L(u−1) to be applied to the branch from node p in layer u−1 to node v in layer u, and Z$_p$(u−1) is the signal value of the p$^{th}$ node in layer u−1. In an embodiment, the same activation function f is used for all nodes (this may not necessarily be the case, though). An exemplary non-linear activation function Z=f(Y) is schematically illustrated in the insert in FIG. 3A. Typical functions used in neural networks are the Rectified Linear Unit (ReLu), the hyperbolic tangent function (tanh), the sigmoid, or softmax function. Other functions may be used, though. Further, the activation function, e.g. the ReLu function, may be parametrized (e.g. to allow different slopes).

Together, the (possibly parameterized) activation function and the weights w (and possible bias parameters b) of the different layers of the neural network constitute the parameters of the neural network. They represent the parameters that (together) are optimized in respective iterative procedures for the neural networks of the present disclosure. In an embodiment, the same activation function f is used for all nodes (so in that case, the 'parameters of the neural network' are constituted by the weights of the layers). In an embodiment, no activation function f is used at least for some of the nodes of the neural network. Parameters of the activation function may, however, be included in the optimization process (e.g. together with node weights and/or bias parameters). Typically, a sigmoid function is used in the output layer for binary decisions. For multi-class decisions, a softmax may e.g. be used.

Typically, the neural network according to the present disclosure is optimized (trained) in an offline procedure, e.g. using a model of the head and torso of a human being (e.g. Head and Torso Simulator (HATS) 4128C from Brüel & Kjær Sound & Vibration Measurement A/S), where the HATS-model is 'equipped' with a hearing device (or a pair of hearing devices) for picking up the (acoustically propagated) training data. In an embodiment, data for training the neural network (possibly in an offline procedure) may be picked up and stored while the user wears the hearing device or hearing system, e.g. over a longer period of time, e.g. days, weeks or even months. Such data may e.g. be stored in an auxiliary device (e.g. a dedicated, e.g. portable storage device, or in a smartphone). This has the advantage that the training data are relevant for the user's normal behaviour and experience of acoustic environments. Ideally, training data that are relevant for the user's normal behaviour and experience of acoustic environments, should be used.

OV detection may as well be used to qualify where in the user's sentence we will be looking for a keyword. It is e.g. unlikely that a user intends to trigger a keyword (e.g. a wake-word or a command word) in the middle of a sentence. OV detection can allow keywords only to be detected in the beginning of a sentence. For example, a rule could be imposed that a keyword can only be detected if own voice has NOT been detected during the last 0.5 second or the last second or last 2 seconds (but is detected 'now'). (In relation to our method for KWS this furthermore has the advantage that the keyword always starts when OV has been detected contrary to any time within a range of e.g. 600 ms. Knowing when a keyword starts is an advantage compared to looking for a keyword which may start anytime within a range of time, cf. e.g. FIGS. 7A-C. It may be necessary to store the audio for KWS in a buffer starting some time before OV is detected, as the OVD may contain some time delay. E.g., if it takes 200 ms to detect OV, the first 200 ms of the keyword may be missing, unless the delay has been taken into account, cf. e.g. FIGS. 8A-D.).

In FIG. 3A, the neural network is exemplified as a feed-forward networks, but other neural network configurations may be used, e.g. a convolutional networks (CNN), recurrent networks, or combinations thereof.

OV information may be used at this stage (cf. OV-Info2 in FIG. 1). In one instance of the system, the OV information may simply be used as yet another input to the KWS system (whose weights W are determined during the training process to make use of this OV input). In another instance of the system, the OV information may be used to improve the quality of the output posterior probabilities. In particular, the posterior probabilities may be weighed (e.g., scaled down) according to the value of the OV information. Using OV information in this way improves performance over systems that do not have access to OV information.

Figure 3C:
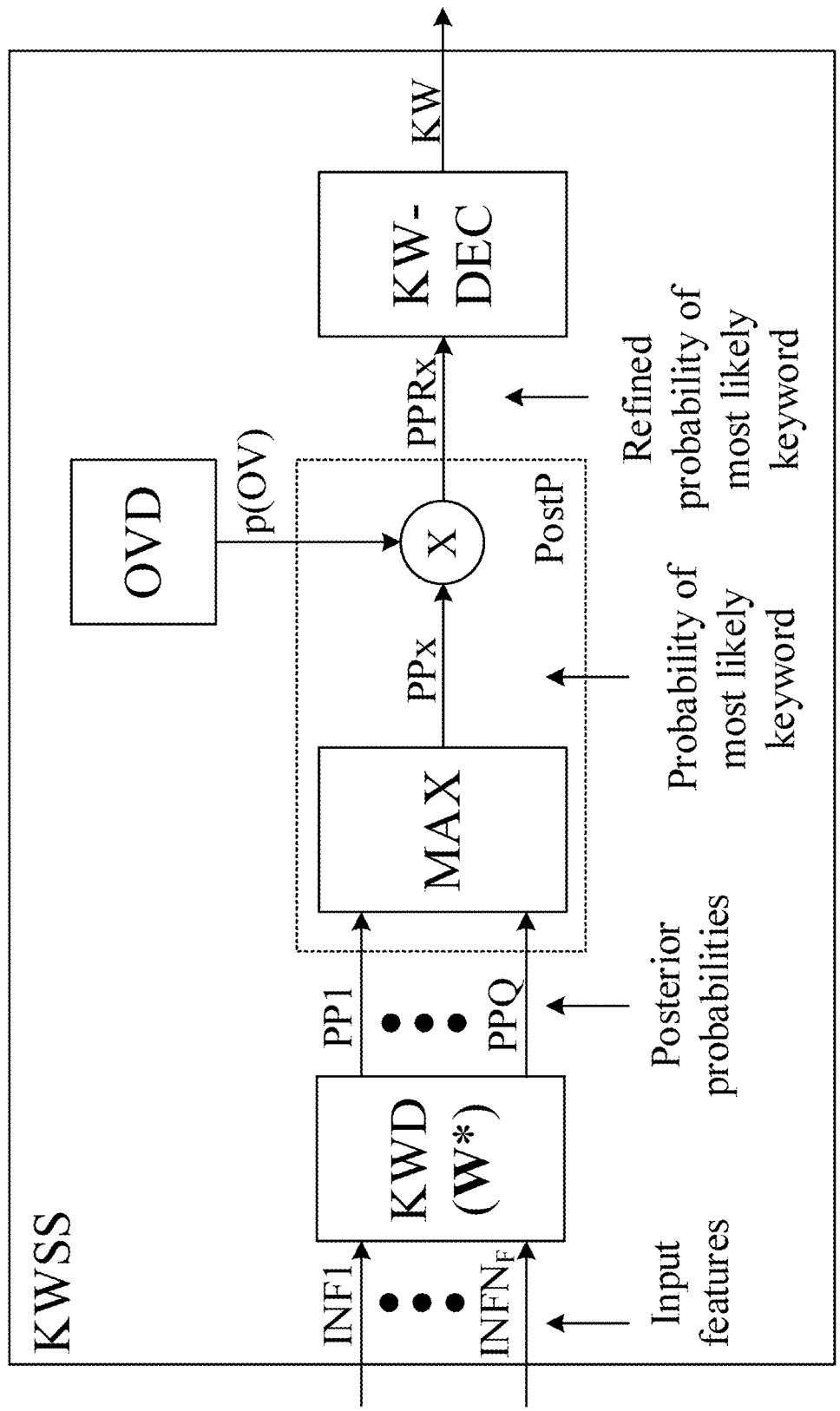
FIG. 3C illustrates an embodiment of keyword spotting system according to the present disclosure.

FIG. 3C illustrates an embodiment of keyword spotting system (KWS) according to the present disclosure. FIG. 3C corresponds to a part of FIG. 1 comprising the keyword detector (KWD), a post-processing block (PostP), and a decision block (KW-DEC). The keyword detector (KWD) may be implemented by a neural network (NN), e.g. a deep neural network (DNN) exhibiting more than two layers (i.e. a number of hidden layers, e.g. in total more than three or 4 layers). The neural network may be defined by weights $w(v,u)$ (e.g. expressed in a matrix W, whose elements are the weights, $w(v,u)$, where v is a node index and u is a layer index, see e.g. FIG. 3A). The neural network of the keyword detector of FIG. 3C may e.g. be implemented by weights (W*) optimized by a training session prior to the normal operation of the hearing device (cf. FIGS. 3D, 3E). The keyword spotting system (KWS) may form part of a hearing device according to the present disclosure, as e.g. described in connection with FIG. 4. In the embodiment of FIG. 3C, the post processing unit (PostP) comprises a maximum operator (MAX) for identifying the keyword having the largest (posterior) presence probability (PPx, corresponding to keyword x). The keyword spotting system further comprises an own voice detector (OVD) for detecting whether or not, or with what probability p(OV), a user's own voice is present in the current input sound signal. The post processing unit (PostP) further comprises a combination unit (e.g. a multiplication unit ('X')) for combining the own voice presence probability (OVPP=p(OV)) and the keyword presence probability (PPx) of keyword x having the largest presence probability. The resulting 'refined posterior probability of most likely keyword' x (PPRx) is fed to the decision unit (KW-DEC). The decision unit is e.g. configured to compare the refined posterior probability PPRx with a threshold value $PPR_{TH}$, e.g. larger than or equal to 0.5 or 0.6, or 0.7, and to provide a resulting keyword (or index of a keyword) or 'no keyword', if the criterion of the decision unit is not fulfilled.

FIG. 3D illustrates a first embodiment of a training procedure for a keyword detector (KWD) comprising a neural network for use in the keyword spotting system (KWSS) of FIG. 3C. The training setup of FIG. 3D resembles the operational keyword spotting system shown in FIG. 3C. In the training setup of FIG. 3D, the own voice detector is not included in the training. In other words the neural network of the keyword detector (KWD) is trained on non-user specific data. The training may e.g. be performed by using numerical optimization methods such as e.g. (iterative) stochastic gradient descent (or ascent), or Adaptive Moment Estimation (Adam). The currently spoken keyword as estimated by the keyword detector is compared with the 'truth' (the known correct keyword of the current audio sequence) and a difference measure ($\Delta E$) for the two is minimized by iteration where weights of the neural network are changed according to the chosen numerical optimization method. The training data may e.g. comprise 1) keywords spoken by the user (at different SNRs, i.e. in various more or less noisy environments), 2) non-keywords spoken by the user, 3) external sounds, incl. non-users speaking keywords, 4) no sound at all (silence). When the error has been minimized for the total database of true training data (data 'truth' in FIG. 3C), the weights W* are frozen and loaded in to the keyword detector for use in the hearing device during operation. This training procedure has the advantage of being independent of a particular own voice detector (and can in principle be based on a general database comprising spoken versions of the relevant keywords, and other data as indicated above).

FIG. 3E illustrates a second embodiment of a training procedure for a keyword detector comprising a neural network in the keyword spotting system of FIG. 3C. The training setup of FIG. 3E resembles the operational keyword spotting system shown in FIG. 3C and the training setup of FIG. 3D. A difference compared to the training setup of FIG. 3D is that the training setup of FIG. 3E includes inputs p(OV) regarding a current own voice speech presence probability (OVPP) from a practical (and potentially non-ideal, i.e. occasionally erroneous) own voice detect (OVD). The current own voice speech presence probability p(OV) is multiplied with the posterior probability (PPx) for keyword x (from the MAX-operator) in multiplication unit ('X') to provide a refined posterior probability (PPRx) for keyword x. The refined posterior probability (PPRx) for keyword x is fed to the detection unit (KW-DEC) for evaluation (e.g. as indicated in connection with FIG. 3D). This training procedure has the advantage taking the measured own voice presence probability into account when calculating optimized weights W* of the neural network (thereby not 'wasting' degrees of freedom of the network (increased complexity) on this task). A disadvantage is that the weights are dependent on the practical own voice detector used during training.

Own voice detection may alternatively be based on a dictionary of time segments representing the Q keywords of the voice control interface. The time segments may be available as a time domain waveform (see FIG. 7B or 8B, or 8D) and/or as a spectrogram (time-frequency representation, see FIG. 3B or 8D). Each keyword may be spoken by the user in different acoustic environments (e.g. having different SNR), and with different vocal effort. During use, a current electric input signal of the hearing device is analysed time segments that might contain keywords of the voice control interface spoken by the user. Such candidates are compared to the keyword elements of the dictionary and a possible match identified according to a comparison criterion (e.g. involving a threshold distance measure). The dictionary may be stored in a memory accessible to the hearing device (e.g. located in the hearing device or in an auxiliary device (via a link) or on a server via a network (e.g. 'in the cloud')).

Post-Processing (PostP):

The (optional) post-processing block (PostP) may refine the posterior probabilities (PP1, ..., PPQ (or PPQ+1)) from the keyword detector (KWD). The purpose of this is to improve the quality of the posterior probability estimates and, hence, finally achieve better KWS performance. The refinement taking place in the post-processing block may consist of operations such as i) smoothing (averaging across time), 2) clipping (e.g., setting low probabilities to zero), 3) limiting, 4) computing the median, 5) etc., of the posterior probabilities. In an embodiment, a wake-word (or a command-word) is (taken to be) detected, if the probability is high (above a threshold value) in a number of consecutive time frames.

The post-processing block (PostP) may also impose sequence structure into the KWS process, e.g., disallowing (e.g., by reducing the posterior probability) certain sequences of keywords.

OV information (e.g. OV detection) may be used at this stage (cf. OV-Info3 in FIG. 1). In one instance of the system, the OV information may serve as an indicator as to whether the output posterior probabilities should count at all (the posterior probabilities may e.g. be set to 0, if the OV information indicates that no OV is present). In another instance of the system, where the OV information is available in terms of a probability of OV activity, the OV probability and the KWS posterior probabilities may be multiplied to form refined posterior probabilities. Clearly, several other meaningful combinations of OV information and KWS output (e.g., in terms of posterior probabilities) can be envisioned. Using OV information in this way improves performance over systems that do not have access to OV information.

The post-processing block (PostP) is optional (cf. its dotted outline in FIG. 1). Meaningful systems exist, where the post-processing block is absent.

Final KWS Decision (KW-Dec):

Finally, a decision regarding detection or not of a predefined keyword is made based on (potentially refined) posterior probabilities (PPR1, ..., PPRQ (or PPRQ+1)), typically by comparison to a threshold value. The decision is a) if a keyword (wake-word/command word) was spoken at a given point in time (cf. index l' in FIG. 3A), and if so b) which keyword it was. OV information (cf. OV-Info4 in FIG. 1) may be used as above to direct the decision (to ensure that the keyword was spoken by the user of the hearing device, e.g. a particular user to whom the hearing device is adapted (if so)). A resulting keyword estimator KWx (possibly and/or a probability of the estimator p(KWx)) is provided by the KW-Decision unit (KW-Dec).

In case no keyword is detected, this may be indicated as KWQ+1 (and/or a corresponding probability, p(KWQ+1)). Alternatively, the (Q+1)th output may represent a probability of the presence of the user's voice, p(OV) (or OVPP).

Clearly, this process may be performed independently in two hearing assistive devices of a binaural hearing system, and their own-voice/KWS decisions may be compared/merged (via an interaural link between the two HA-devices) for improved accuracy.

Users' Own Voice Detection:

FIG. 1 uses the term OV-information (OV-info1, OV-Info2, OV-Info3, OV-Info4). The term should be understood as any signal (i.e. as a function of time), which indicates if the user is speaking or not. The information could e.g., be in terms of a time-varying speech presence probability, or a binary signal indicating OV activity (or not).

The activity of the users' OV may be detected using standard methods for voice activity detection, e.g. be modulation based.

In general, however, better performance may be achieved, if special characteristics of the OV detection problem are taken into account. The OV information indicated in FIG. 1 may be found using one or more of the methods below:

a) Dedicated OV-sensors, e.g.,
  i. microphones located in special positions with the purpose of detecting/retrieving own voice
  ii. bone conduction sensors, e.g., accelerometers, etc.
  iii. EEG-electrodes, e.g., for detecting muscle activity associated with the users' OV speech production.
  iv. PPG (photoplethysmogram)-sensors.
  v. OV activity could also be detected or ruled out by an instrument-being-worn detector (e.g., based on accelerometers, gyros, binaural communication, video recording of the mouth, etc.). If the instrument is clearly not being worn by the user, KWS is irrelevant and should be shut down (e.g. to save power).
  vi. Etc.
b) Single-channel/microphone (spectro)-temporal voice activity detectors (incl. traditional methods based on modulation depth, but also DNN-based systems).
c) Multi-channel/microphone spatio-spectral methods. Adaptive beamforming systems tend to point in direction of loudest sound activity—when OV is active, adaptive beamformers tend to "point towards" OV source, and this can be detected. OVD may e.g. be based on a maximum likelihood approach (cf. e.g. EP3413589A1).
d) Multi-channel/microphone spatio-spectro-temporal methods, including own-voice beamforming systems for retrieval of a noise-reduced OV signal, followed by single-channel voice activity detectors (see b) above).
e) Multi-channel/microphone spatio-spectro-temporal systems, e.g., DNN-systems with multiple-microphone inputs, trained to give a posterior probability of OV activity as output.
f) In binaural situations, any of the methods above could be combined across the ears of the user, e.g., by exchanging information/decisions wirelessly (via a communication link) between the two hearing assistive devices in order to improve the accuracy of the final decision. KWS may be based on the combination of (e.g. final decisions of) two monaural systems (e.g. by a logic criterion, e.g. and 'AND' operation).

In a hearing device application, the electric input signals (IN1, ..., INM) from the microphones (Mic1, ..., MicM) may form inputs to forward path of the hearing device for processing a sound signal provided by the electric input signals (e.g. based on a (e.g. linear or non-linear) combination of the electric input signals provided by a beamformer filter). The forward path may e.g. (in addition to or comprising the beamformer filter) comprise a signal processor for applying one or more processing algorithms to a signal of the forward path and an output unit for providing stimuli perceivable as sound to the user. An exemplary block diagram of a hearing device comprising a keyword spotting system (KWSS) of FIG. 1 is illustrated in FIG. 4.

Figure 4:
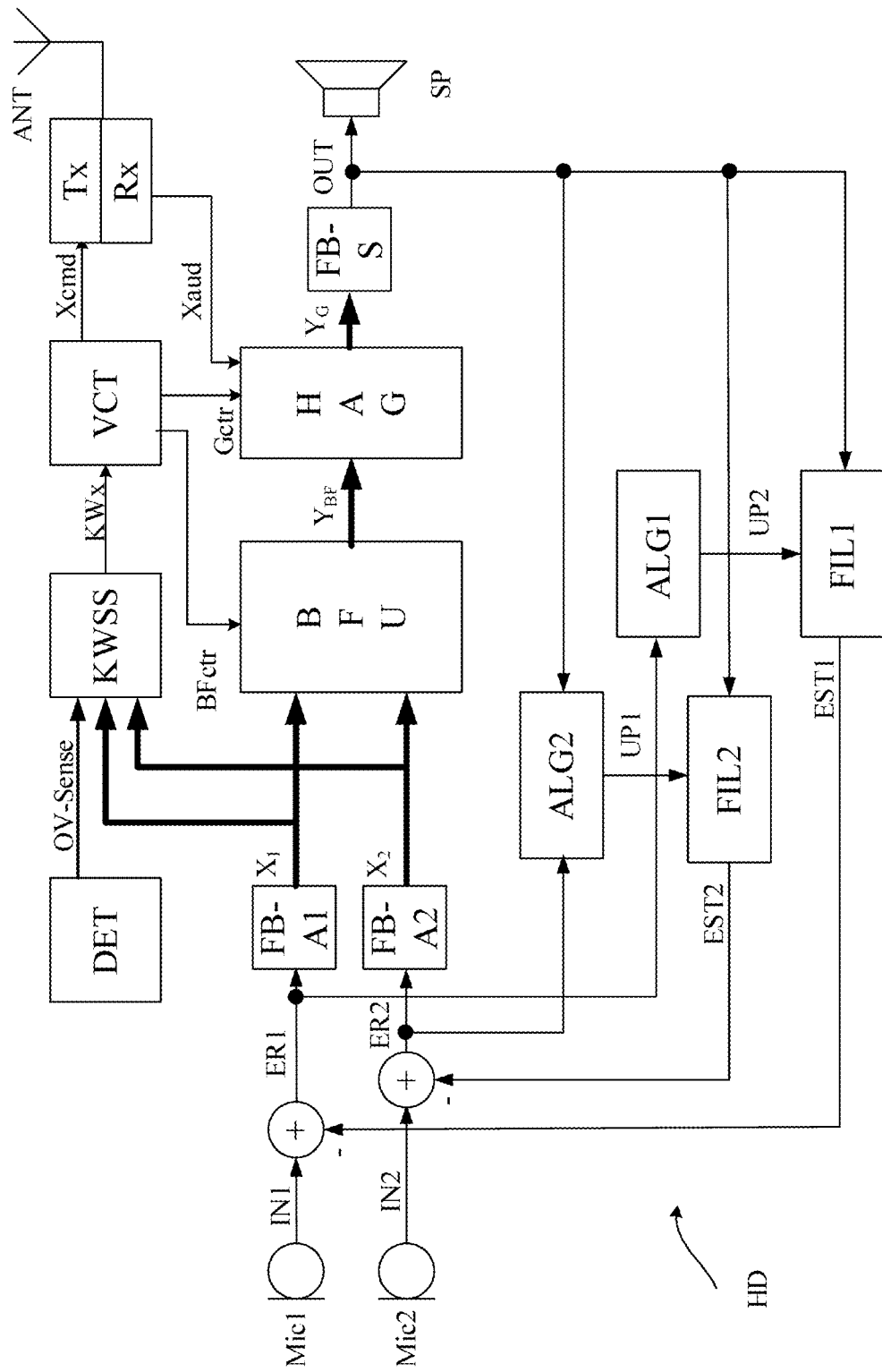
FIG. 4 shows an embodiment of a hearing device comprising a keyword spotting system according to the present disclosure.

FIG. 4 shows an embodiment of a hearing device comprising a keyword spotting system according to the present disclosure. The hearing device (HD) of FIG. 4, e.g. a hearing aid, comprises first and second microphones (Mic1, Mic2) providing respective first and second electric (e.g. digitized) input signals (IN1, IN2) representative of sound in the environment of the hearing device. The hearing device is configured to be worn at or in an ear of a user. The hearing device comprises a forward path comprising the two microphones, two combination units ('+') for subtracting first and second feedback path estimates (EST1, EST2) from the first and second electric input signals, respectively, thereby providing first and second feedback corrected input signals (ER1, ER2). The forward path further comprises first and second analysis filter banks (FB-A1, FB-A2) for converting the first and second feedback corrected (time domain) input signals (termed error signals) (ER1, ER2) to first and second frequency sub-band signals (X1, X2), respectively. The frequency sub-band signals of the forward path are indicated by bold line arrows in FIG. 4. The forward path further comprises a beamformer filtering unit (BFU) for providing a spatially filtered signal $Y_{BF}$ in dependence of the first and second (feedback corrected) input signals (ER1, ER2). The beamformer filtering unit (BFU) may e.g. be configured to substantially leave signals from a target direction unattenuated while attenuating signals from other directions, e.g. adaptively attenuating noise sources around the user wearing the hearing device. The forward path further comprises a processor (HAG) for applying one or more processing algorithms to the beamformed signal $Y_{BF}$ (or a signal derived therefrom), e.g. a compressive amplification algorithm for applying a frequency and level dependent compression (or amplification) to a signal of the forward path according to a user's needs (e.g. a hearing impairment). The processor (HAG) provides a processed signal ($Y_G$) to a synthesis filter bank (FB-S) for converting a frequency sub-band signal ($Y_G$) to a time domain signal (OUT). The forward path further comprises a loudspeaker (SP) for converting the electric output signal (OUT) to an output sound intended for being propagated to the user's ear drum. The embodiment of a hearing device (HD) of FIG. 4 comprises a feedback control system for providing first and second estimates (EST1, EST2) of the feedback paths from the loudspeaker (SP) to the first and second microphones (Mic1, Mic2), respectively, and minimizing (or cancelling) the feedback in the respective first and second electric input signals (IN1, IN2) by subtracting the first and second feedback path estimates (EST1, EST2), respectively, therefrom. This is done by first and second SUM-units ('+') thereby providing the first and second feedback corrected input signals (ER1, ER2). The feedback path estimates (EST1, EST2) are provided by first and second adaptive filters, each comprising an adaptive algorithm (ALG1, ALG2) and a variable filter (FIL1, FIL2). The variable filters are e.g. linear time invariant filters to estimate the feedback path with its filter weights being updated over time (cf. signals UP1 and UP2). The update of filter weights (coefficients) may e.g. be calculated using stochastic gradient algorithms, including some form of the Least Mean Square (LMS) or the Normalized LMS (NLMS) algorithms (here by units ALG1 and ALG2). They both have the property to minimize an 'error signal' (here ER1 and ER2, respectively) in the mean square sense, with the NLMS algorithm additionally normalizing the filter update with respect to the squared Euclidean norm of a reference signal (here output signal OUT). The first and second feedback corrected frequency sub-band signals ($X_1$, $X_2$) are (in addition to the beamformer filtering unit (BFU)) fed to a keyword spotting system (KWSS) according to the present disclosure as e.g. illustrated in FIG. 1 and discussed in connection with FIGS. 1, 2A, 2B, 3A, 3B.

The hearing device (HD), e.g. the keyword spotting system (KWSS), may comprise a number of detectors for supporting the own voice detection (cf. detector unit DET in FIG. 4). Relevant detectors may e.g. be vibration sensitive detectors (e.g. accelerometer, microphone, etc.), photo sensitive-sensors (e.g. camera, PPG), bio-sensors (e.g. EEG-sensor), instrument-on-ear?-detector (to detect whether the hearing device is currently worn by a user), feedback detector, etc. The one or more detectors provide corresponding sensor signals (cf. signal OV-Sense in FIG. 4). The hearing device, e.g. the detector unit (DET) or the keyword spotting system, may comprise a dedicated own voice detector for estimating whether or not (or with what probability) a given input sound (e.g. a voice, e.g. speech) originates from the voice of the user of the system. In an embodiment, the own voice detector is adapted to be able to differentiate a user's own voice from another person's voice and possibly from NON-voice sounds. The own voice detector may be configured to detect the voice of the particular user, to whom the hearing device is fitted (e.g. to compensate for a hearing impairment). The own voice detector may e.g. operate on one or more of the first and second (possibly feedback corrected) electric input signals and/or on a spatially filtered signal (e.g. from an own voice beamformer, see e.g. FIG. 2B). The own voice detector may be configured to influence its indication (of OV or not, or p(OV)) by a signal from one or more of the detectors. The keyword spotting system (KWSS) may comprise a keyword detector (KWD, see e.g. FIGS. 1, 7A, 8A, 9) configured to determine whether or not (or with what probability p(KWx)) the current electric input signals comprise a particular one (KWx) of a number Q (e.g. ≤10) of predefined keywords. In an embodiment, a decision regarding whether or not or with what probability the current electric input signals comprises a particular keyword AND is spoken by the user of the hearing device is determined as a combination of simultaneous outputs of a KWS-algorithm (e.g. a neural network, cf. e.g. FIGS. 3A, 3B) and an own voice detector (e.g. as an AND operation of binary outputs or as a product of probabilities of a probabilistic output).

The result (e.g. KWx and/or p(KWx)) of the keyword spotting system (KWSS) at a given point in time is fed to a voice control interface (VCT) configured to convert a given detected keyword to a command (BFctr, Gctr, Xcmd) for controlling a function of the hearing device (HD) and/or of another device or system. One of the keywords may relate to controlling the beamformer filtering unit (BFU) of the hearing device (HD), e.g. an omni- or DIR mode (e.g. 'DIR-back', or 'DIR-right', to give a currently preferred direction of the beamformer, other than a default direction, e.g. a look direction), cf. signal BFctr. The same or another one of the keywords may relate to controlling the gain of the processor (HAG) of the hearing device (HD), e.g. 'VOLUME-down' or 'VOLUME-up' to control a current volume of the hearing device), cf. signal Gctr. The same or another one of the keywords may relate to controlling an external device or system, cf. signal Xcmd. Other functions of the hearing device may be influenced via the voice control interface (and/or via the detectors, e.g. the own voice detector), e.g. the feedback control system, e.g. whether an update of filter coefficients should be activated or disabled, and/or whether the adaptation rate of the adaptive algorithm should be changed (e.g. increased or decreased)). A command may be transmitted to another device or system via appropriate transmitter (Tx) and antenna (ANT) circuitry in the hearing device. Further, a telephone mode, wherein a user's own voice is picked up by a dedicated own-voice beamformer and transmitted to a telephone, and an audio signal (Xaud) is received by appropriate antenna and receiver circuitry (ANT, Rx) from the telephone and presented to the user via an output unit (e.g. a loudspeaker, here SP) of the hearing device, may be entered (or left) using a command spoken by the user (e.g. 'TELEPHONE' to take (or close) a telephone call). Preferably, the keyword detector of the hearing device is capable of identifying a limited number of keywords to provide voice control of essential features of the hearing device, e.g. program shift, volume control, mode control, etc., based on local processing power (without relying on access to a server or another device in communication with the hearing device). In an embodiment, activation of a 'personal assistant' (such as 'Siri' of Apple devices or 'Genie' of Android based devices or 'Google Now' or 'OK Google' for Google applications or 'Alexa' for Amazon applications) on another device, e.g. a smartphone or similar (e.g. via an API of the other device), may be enabled via the voice control interface of the hearing device. The keyword detector of the hearing device may be configured to detect the wake-word (e.g. 'Genie') as one of the keywords, and when it is detected to transmit it (or another command, or the following words or sentences spoken by the user, or a communication partner) to the smartphone (e.g. to an APP, e.g. an APP for controlling the hearing device), from which the personal assistant or a translation service (e.g. initiated by another subsequent keyword, e.g. 'TRANSLATE') may thereby be activated.

FIGS. 5A and 5B show first and second exemplary speech waveform comprising a keyword for a keyword spotting system of a hearing device according to the present disclosure. The figures each schematically illustrate a time domain waveform (sound pressure level (SPL) [dB] versus time [s], (from t=0 to t=1.5 s)) a signal comprising speech and speech pauses. Each of FIGS. 5A and 5B comprises three speech elements separated by respective speech pauses. The middle one of the speech elements represents a keyword (here denoted KW1, e.g. a wake-word for a voice control interface). The left and right speech elements are not keywords. The middle keyword (KW1) is separated in time from the previous (left) and following (right) speech elements by speech pauses (possibly containing noise) of duration $\Delta T_{pre-KW}$ and $\Delta T_{pro-KW}$, respectively. FIG. 5A and FIG. 5B differ in the length of the speech pauses. FIG. 5A illustrates relatively short speech (≤100 ms) pauses before and after the keyword (KW1), whereas FIG. 5B illustrates relatively long (≥250 ms) speech pauses before and after the keyword (KW1). The keyword detector may be configured to only consider a speech element (or a detected keyword as valid) for keyword detection, if a speech pause preceding the speech element is longer than a predefined threshold value, e.g. $\Delta T_{pre-KW,th} \geq 0.5$ s, or ≥2 s. The keyword detector may be further configured to only consider a speech element (or a detected keyword as valid) for keyword detection, if a speech pause proceeding the speech element is longer than a predefined threshold value, e.g. $\Delta T_{pro-KW,th} \geq 0.5$ s, or ≥2 s.

Figure 5C:
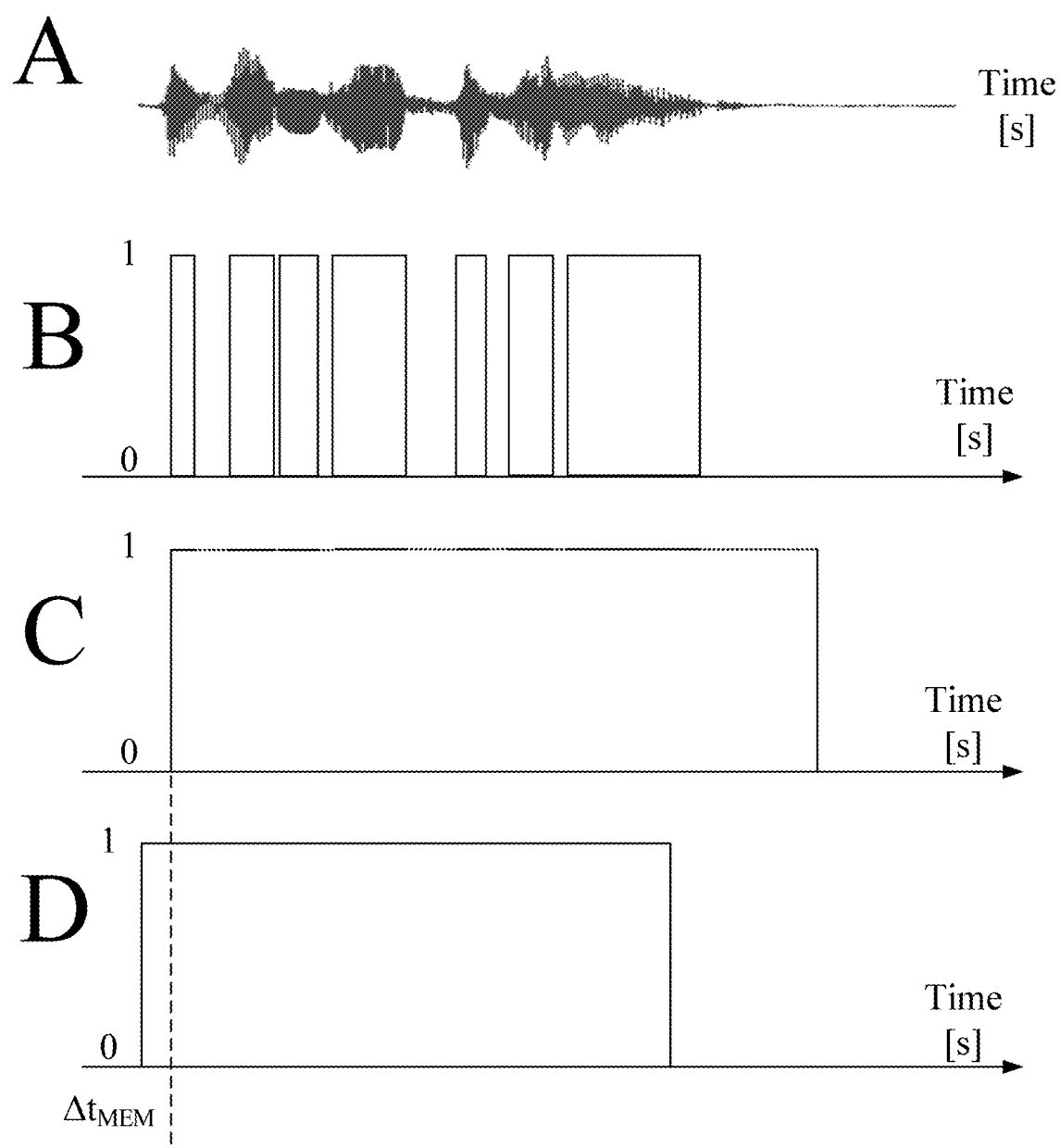
FIG. 5C shows a third exemplary waveform comprising speech and corresponding speech activity indicators.
Figure 5D:
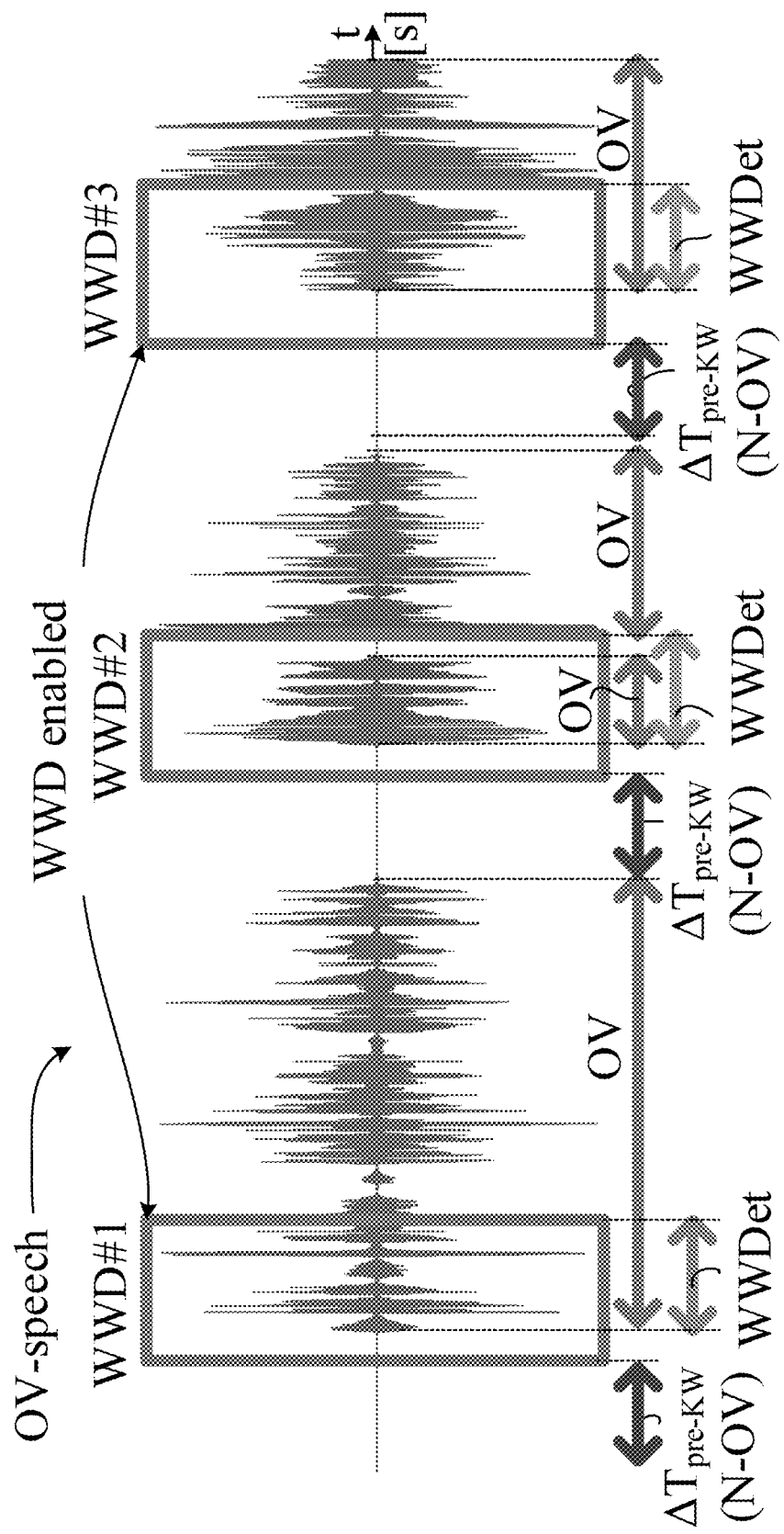
FIG. 5D shows an exemplary own-voice speech waveform, illustrating a scheme for detecting a wake-word according to the present disclosure.

A practical example with a time domain waveform versus time for a spoken own voice sentence comprising a keyword in the beginning of a sentence is shown in FIG. 5C (A). The output of an exemplary own voice detector is illustrated in FIG. 5C (B). It can be seen that 'own voice' is not necessarily detected in between words. As an enabler for KWS it is thus advantageous if the own voice decision is hold for a while, after own voice has been detected (and possibly after a 'NOT own voice'-indication has been provided). Hereby a fluctuating (positive) is avoided. This is illustrated in FIG. 5C (C). As a keyword typically is spoken in the beginning of a sentence, the time window may be shorter than the spoken sentence, as shown in FIG. 5C (D). If, for example, the keyword is followed by a command word, the window may be prolonged. Furthermore, the window (where we look for a keyword) may start some time before own voice is detected as the detected own voice may be delayed compared to the onset of the own voice sentence (see e.g. FIGS. 8A-8D). This is illustrated in FIG. 5C (D) too, cf. time delay $\Delta t_{MEM}$. FIG. 5D shows an exemplary own-voice speech waveform (OV-speech) versus time (t [s]), illustrating a scheme for detecting a wake-word according to the present disclosure. FIG. 5D schematically illustrates the time-window wherein wake-word detection is enabled. The time-window is opened after a certain duration of non-OV detection (N-OV), i.e. during own-voice pauses. The time periods are indicated by the solid rectangles denoted WWD #1, WWD #2, WWD #3. The time-window is closed a certain time-period (WWDet) after the own voice has been detected (as indicated by the solid rectangle around a time segment of the electric input signal). The full time periods of own voice detection and non-own voice detection are indicated (by OV and N-OV, respectively). As indicated in FIG. 5D, the time window considered by the wake-word detector (indicated by the solid rectangle) comprises a time period of non-OV detection preceding the own voice detection (cf. $\Delta T_{pre-KW}$ in FIG. 5B) and a time period comprising own-voice (denoted WWDet in FIG. 5D).

FIGS. 6A 6B, 6C, 6D show first, second, third and fourth exemplary inputs and outputs of a keyword detector (KWD) according to the present disclosure. All four embodiments provide as outputs of the keyword detector (KWD) the detected keyword KWx (and an optional own voice indicator KW(Q+1)). Alternatively or additionally, a probability p(KWx) of each of the Q keywords and (optionally) an own voice presence probability (OVPP) are provided as output, x=1, . . . , Q, Q+1. All four embodiments provide inputs to the keyword detector (KWD) in the frequency domain (as indicated by bold arrows, cf. FIG. 2B ('OV-Info1')). In FIG. 6A, M electric input signals (e.g. from M microphones (cf. e.g. FIG. 1)) are provided as inputs to the keyword detector (KWD). The embodiment of FIG. 6B is equal to the embodiment of FIG. 6A, apart from the fact that a further own voice input (OV-Info) is provided to the keyword detector (KWD). The OV-Info signal may provide an own voice indicator vs time, cf. e.g. FIGS. 5C, 7C, 8C, to qualify and/or control the keyword detection process (cf. e.g. FIGS. 7A, 8A, 9). In FIG. 6C, an output $Y_{OV}$ of an own voice beamformer (cf. e.g. FIG. 2B) is provided as inputs to the keyword detector (KWD). Alternatively, a further noise reduced own voice signal $Y_{OV}NR$ (e.g. the output of a post filter, e.g. SC-NR in FIG. 2B) may be used as input to the keyword detector. The use of a signal from an own voice beamformer is that user's own voice may be provided in a better quality than in any of the individual electric input signals (IN1, . . . , INM). The embodiment of FIG. 6D is equal to the embodiment of FIG. 6C, apart from the fact that a further own voice input (OV-Info) is provided to the keyword detector (KWD).

An input vector comprising a number of time frames of the input signals (IN1, . . . , INM), or $Y_{OV}$, or $Y_{OV}NR$ may be fed to a neural network of the keyword detector, cf. e.g. FIGS. 3A, 3B). The neural network is preferably trained on a data set comprising known combinations of keywords and non-keywords in various acoustic environments spoken by the user and by non-users.

Figure 7A:
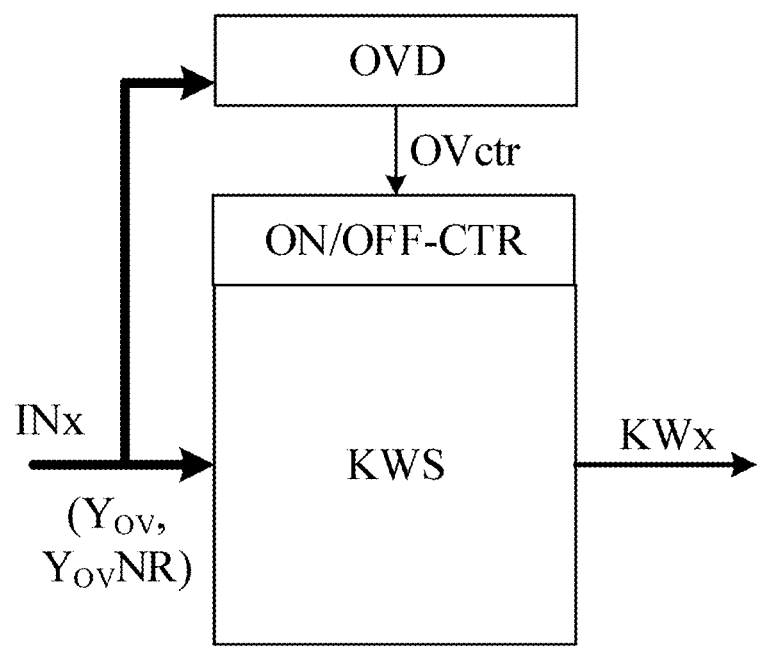
FIG. 7A shows a keyword detector for a voice control interface comprising an on-off controller receiving a control input from an own voice detector according to an embodiment of the present disclosure.

FIG. 7A shows a keyword detector (KWD) for a voice control interface comprising an on-off controller (ON/OFF-CTR) receiving a control input (OVctr) from an own voice detector (OVD) according to an embodiment of the present disclosure. The keyword detector (KWD) receives as input signal(s) one or more electric input signals (INx) (e.g. from one or more microphones) or output $Y_{OV}$ of an own voice beamformer, or the output $Y_{OV}NR$ of a post filter for further reducing noise in the own voice signal $Y_{OV}$ from the own voice beamformer (cf. also FIGS. 6A, 6C). Some of or all input signals to the keyword detector are also fed to the own voice detector (OVD), which provide an own voice indicator (OVctr) providing an indication of whether or not or with what probability the current input (audio) signal to the keyword detector comprises the user's own voice. The own voice indicator (OVctr) is fed to the on-off controller (ON/OFF-CTR) for controlling the activation or deactivation of the keyword detector. The on-off controller (ON/OFF-CTR) is e.g. configured to only activate the keyword detector (KWD) when own voice indicator (OVctr) indicates the presence of the user's own voice (possibly with some hysteresis/delay in disabling the keyword detection to avoid toe rapid/frequent on-off-on-off events). FIG. 7B schematically illustrates an exemplary a time domain waveform (sound pressure level (SPL) [dB] versus time [s]) of a signal comprising speech and speech pauses, specifically three speech elements separated by respective speech pauses (as also described in connection with FIGS. 5A, 5B). All three speech elements OVa, OVb and OVc are spoken by the user of the hearing device. The middle speech element OVb is assumed to be one of the predefined keywords (KW1). FIG. 7C illustrates the time dependency of the own voice indicator (OVctr) from the own voice detector (OVD) corresponding to the waveform of FIG. 7B. The own voice indicator (OVctr) is equal to one over the illustrated time period (reflecting that the waveform is spoken by the user of the hearing device), and the keyword detector is accordingly activated to analyse the speech elements and to detect the predefined keyword (KW1) provided by the middle speech element (OVb). Time constants of the own voice detector may be configured to allow a rapid switching between OV-detection and NON-OV-detection depending on the application (cf. dashed part of the graph). Small time constants (rapid detection) may be advantageous to allow a detection of a small NON-OV-time period before and after a wake-word (or other keywords), for example.

Figure 8A:
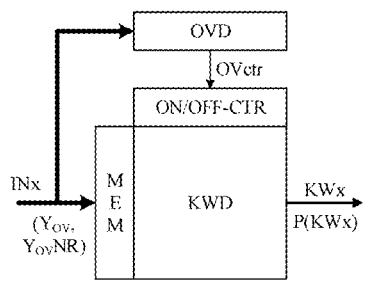
FIG. 8A shows a keyword detector for a voice control interface comprising an on-off controller receiving a control input from an own voice detector and a memory unit for storing a number of successive time frames of the input signal to the keyword detector according to an embodiment of the present disclosure.

FIG. 8A shows a keyword detector (KWD) for a voice control interface comprising an on-off controller (ON/OFF-CTR) receiving a control input (OVctr) from the own voice detector and a memory unit (MEM) for storing a number of successive time frames (see e.g. FIGS. 3A, 3B) of the input signal (INx, or $Y_{OV}$, or $Y_{OV}NR$) to the keyword detector (KWD) according to an embodiment of the present disclosure. The embodiment of FIG. 8A is equal to the embodiment of FIG. 7A apart from the input memory unit (MEM) to the keyword detector. The input memory unit allows the 'construction' of an input vector (e.g. to a neural network, see e.g. FIGS. 3A, 3B) comprising a number of time frames prior to a current time frame of the input signal to the keyword detector (so that the keyword detector (KWD) has an appropriate 'history' of the input signal to analyse for keywords). The input memory unit (MEM) also allows the own voice detector (OVD) to provide the own voice indicator (OVctr) to the on-off controller (ON/OFF-CTR) in advance of the first input vector being presented to the keyword detector (so that the on-off controller (ON/OFF-CTR) can activate the keyword detector in time to receive the first input vector comprising own voice speech elements.

Figure 8B:
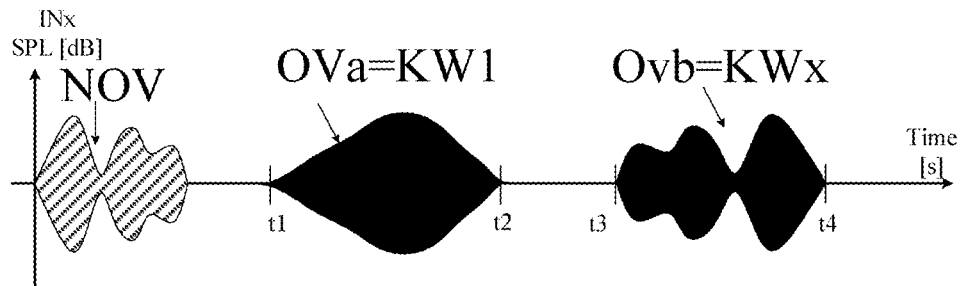
FIG. 8B shows an exemplary speech waveform comprising a number of keywords for the keyword detector according to the present disclosure.

FIG. 8B shows an exemplary speech waveform comprising a number of keywords ((KW1, KWx) for the keyword detector (KWD) according to the present disclosure. FIG. 8B schematically illustrates an exemplary a time domain waveform (sound pressure level (SPL) [dB] versus time [s]) of a signal comprising speech and speech pauses, specifically three speech elements separated by respective speech pauses (as also described in connection with FIGS. 5A, 5B and FIG. 7A). In FIG. 8B, the first speech element (denoted NOV, not own voice) is not spoken by the user of the hearing device, whereas the second and third speech elements OVa, OVb are spoken by the user of the hearing device. The second speech element OVa is assumed to be the wake-word of a voice control interface of the hearing device (OVA=KW1) and the third speech element OVb is one of the predefined keywords (KWx).

Figure 8C:
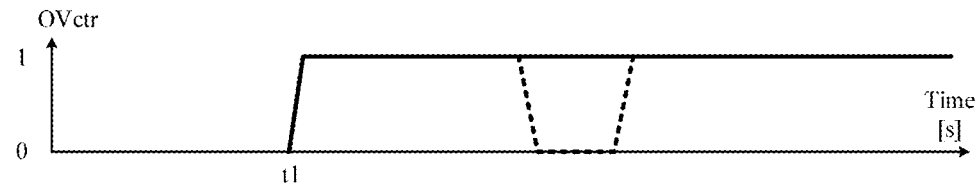
FIG. 8C shows a control output from the own voice detector of FIG. 8A corresponding to the speech waveform of FIG. 8B.

FIG. 8C shows a control output from the keyword detector of FIG. 8A corresponding to the speech waveform of FIG. 8B, the input signal to the memory unit being directly fed to the own voice detector (OVD) allowing the own voice indicator (OVctr) to reflect the (un-delayed) input signal of FIG. 8B. The user's own voice is detected at time t1, where the first speech element spoken by the user occurs in the input signal INx (OVctr='1'). Before that the own voice indicator (OVctr) reflects the absence of the user's own voice (OVctr='0'). Time constants of the own voice detector may be configured to allow a rapid switching between OV-detection and NON-OV-detection depending on the application (cf. dashed part of the graph).

Figure 8D:
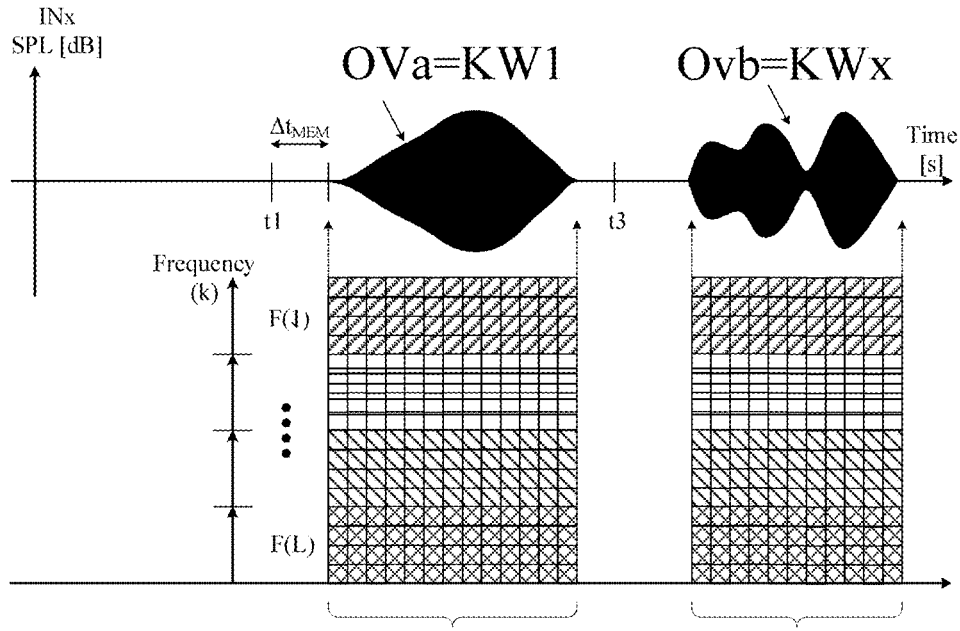
FIG. 8D shows (schematic) exemplary input vectors comprising successive spectra of a number of time frames of the input signal for two exemplary keywords of the voice control interface.

FIG. 8D shows (schematic) exemplary input vectors comprising successive spectra of a number of time frames of the input vector to the keyword detector (KWD) as provided by the memory (MEM) for two exemplary keywords of the voice control interface. In the bottom part, spectrograms of L successive time frames of the input signal comprising the first and second keywords (KW1, KWx) identified by the keyword detector (controlled by the own voice detector) are schematically illustrated. In the top part of FIG. 8D the part of the input (audio) waveform (of input signal INx) that is spoken by the user is indicated but delayed compared to FIG. 8B to include the delay of the memory (MEM) to build the input vector to the keyword detector.

Figure 9:
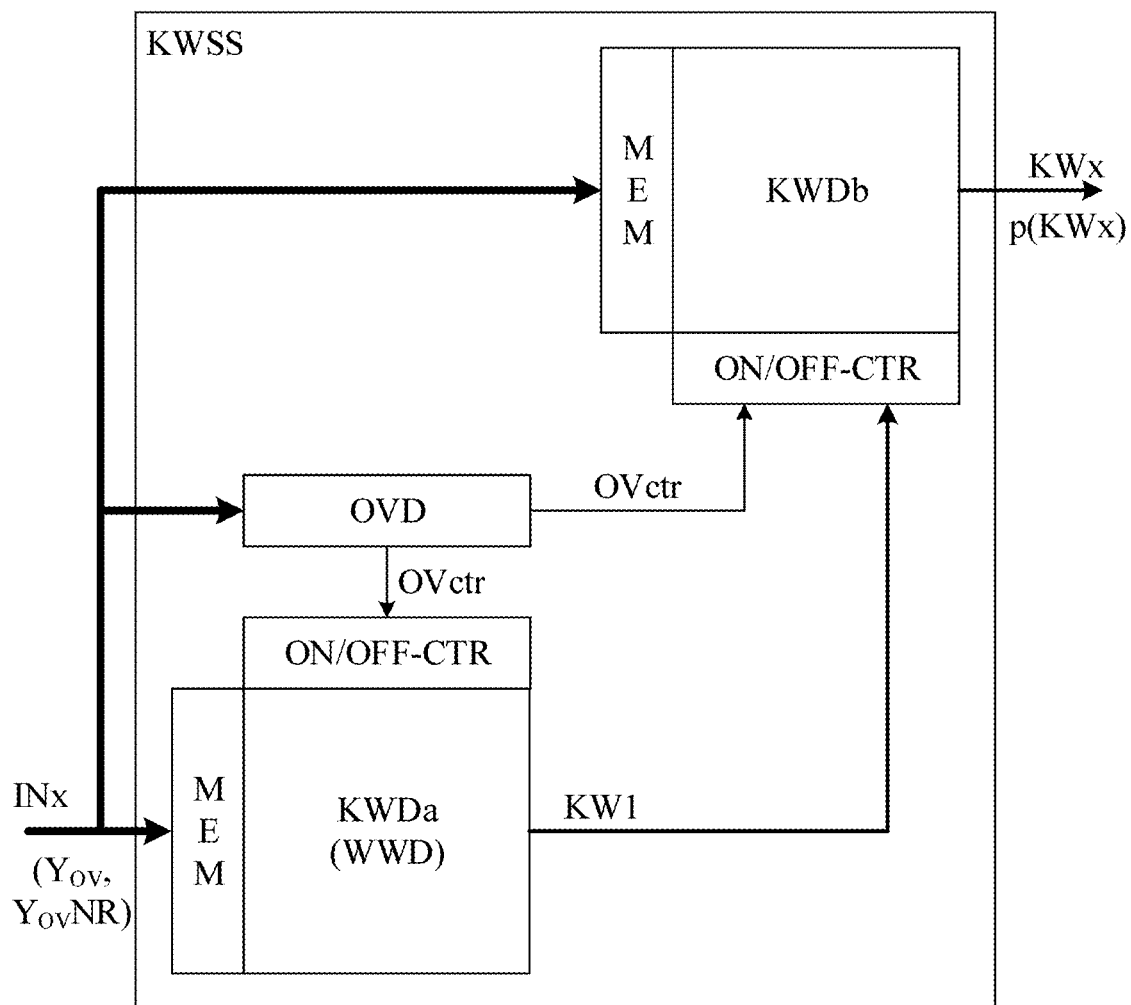
FIG. 9 illustrates an embodiment of a keyword spotting system according to the present disclosure, FIG. 10 schematically shows a use scenario of a hearing aid system according to the present disclosure, FIG. 11A schematically shows a first embodiment of a part of a hearing device according to the present disclosure comprising a transmission control of audio data or data derived therefrom to an external device, based on an analysis of the incoming audio signal, FIG. 11B schematically shows a second embodiment of a part of a hearing device according to the present disclosure as in FIG. 11A, where the analysis of the incoming signal comprises own voice detection.

FIG. 9 illustrates an embodiment of a keyword spotting system (KWSS) according to the present disclosure. The keyword spotting system (KWSS) is configured to detect whether or not, or with what probability, a particular keyword KWx (x=1, . . . , Q) is present in a current audio stream (INx (or $Y_{OV}$ or $Y_{OV}$NR, etc.) presented to the keyword spotting system. In the embodiment of FIG. 9, the keyword spotting system comprises a keyword detector (KWD) that is split into first and second parts (KWDa, KWDb). The first part of the keyword detector (KWDa) comprises a wake-word detector (WWD), denoted KWDa (WWD) for detecting a specific wake-word (KW1) of the voice control interface of the hearing device. The second part of the keyword detector (KWDb) is configured detect the rest of the limited number of keywords (KWx, x=2, ..., Q). The voice control interface of the hearing device is configured to be activated by the specific wake-word spoken by the user wearing the hearing device. The dedicated wake-word detector (KWDa (WWD)) is e.g. located in the hearing device. The rest of the Q−1 keywords may be detected by the second part of the keyword detector (KWDb) may be located in the hearing device or in another device (e.g. a smartphone, or on a server accessible via a smartphone). The control of the first and second parts of the keyword detector follows along the lines described in connection with FIG. 8A. The activation of the second part of the keyword detector (KWDb) is, however, in the embodiment of FIG. 9 made dependent of the own voice indicator (OVctr) as well as the detection of the wake-word (KW1) by the first part of the keyword detector (KWDa) (the wake-word detector). The first and/or the second parts of the keyword detector may be implemented as respective neural networks, whose weights are determined in advance of use (or during a training session, while using the hearing device) and applied to respective networks.

Figure 10:
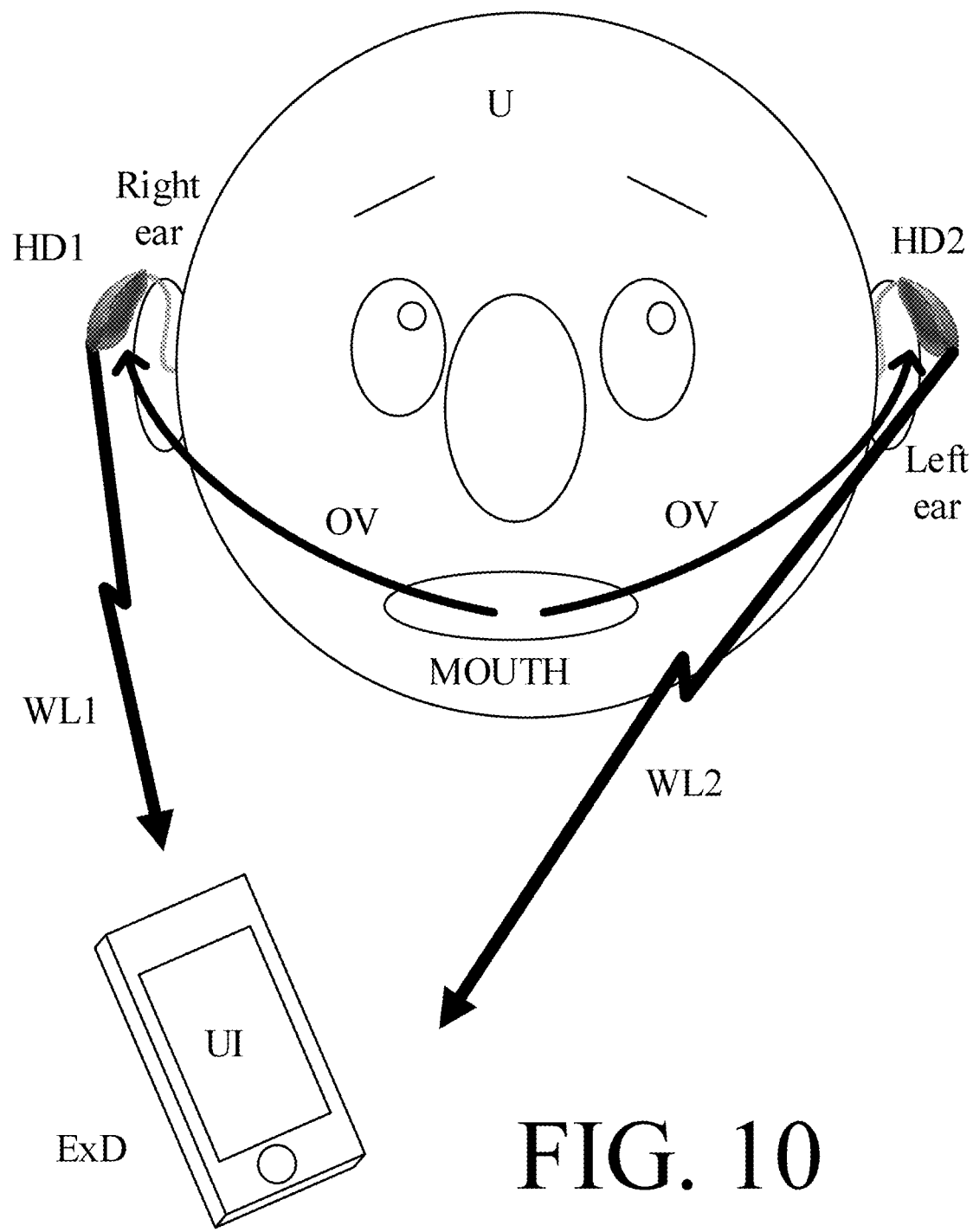

Examples of a Hearing Device According to the Present Disclosure:

FIG. 10 shows a binaural hearing system comprising first and second hearing devices (HD1, HD1) with limited computational power wirelessly connected to an external device (ExD) via respective communication links (WL1, WL2). A keyword detection algorithm may partly run in the hearing devices (HD1, HD2) and partly run in the external device (ExD). The hearing system (e.g. one or both hearing devices, e.g. in cooperation with the external device) may thereby implement a voice control interface. The external device (ExD) may e.g. be configured to run an application (APP) for implementing a user interface (UI) for controlling the hearing system and/or for displaying information related to the hearing system, e.g. results of keyword detection, results of voice commands, etc. The application may be configured to allow the reception from the hearing device of a wake-word of a personal assistant of the external device (e.g. a smartphone), e.g. 'Alexa', and possible further spoken words by the user, and its/their further processing in the external device.

Figure 11A:
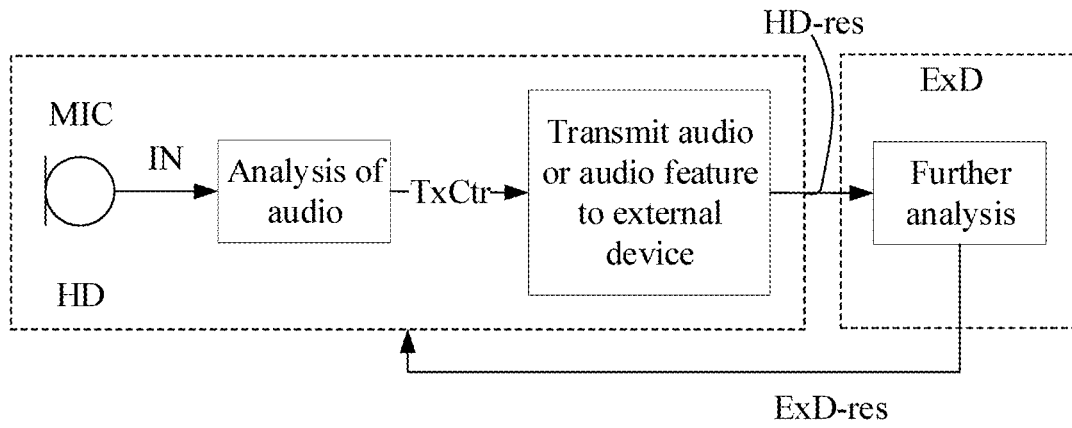
FIG. 11C schematically shows a third embodiment of a part of a hearing device according to the present disclosure as in FIG. 11A or 11B, where the analysis of the incoming signal comprises wake-word detection.

FIG. 11A shows an embodiment of a hearing device (HD) in communication with an external device (ExD) according to the present disclosure. Both analysis of audio and transmitting audio may drain the battery power of a hearing device. It is therefore desirable to find a good compromise between using an external device for computationally expensive calculations while minimizing the amount of data (HD-res) to be transmitted between the devices. The hearing device comprises an 'Analysis of audio' processor which based on the electric input signal (IN) from the microphone (MIC) provides a transmission control signal (TxCtr) for enabling and disabling transmission of the audio signal to the external device, cf. unit 'Transmit audio or audio feature to external device'. The resulting signal (HD-res) is transmitted to the external device (or not) in dependence of the transmission control signal (TxCtr). The resulting signal may in the embodiment of FIG. 11A e.g. comprise the current contents of the input buffer (which may be the incoming audio signal or features extracted therefrom). The external device may communicate the result (ExD-res) of the analysis back to the hearing device or communicate a decision back to the hearing device, such as e.g. a volume change or a program change.

In the present disclosure, a scheme to determine when to transmit (and when not to transmit) an audio signal or a feature derived from the audio signal (e.g. picked up by a low-power device, such as a hearing device) with the purpose of further analysis in an external device (having more processing power) is proposed.

One option is to do all processing in the external device. This would however require that data is constantly transmitted to the external device. Therefore, we propose to do a pre-analysis of the audio signal before transmission is enabled (cf. e.g. FIG. 11A).

In an aspect of the present disclosure, a keyword spotting system which can detect a wake-word followed by a voice command, is fully or partially included in a hearing device. However, the idea to utilize a low-power detection system to enable transmission from the hearing device to an external device for further analysis may be relevant for other applications than keyword detection, e.g. sound scene detection.

Figure 11B:
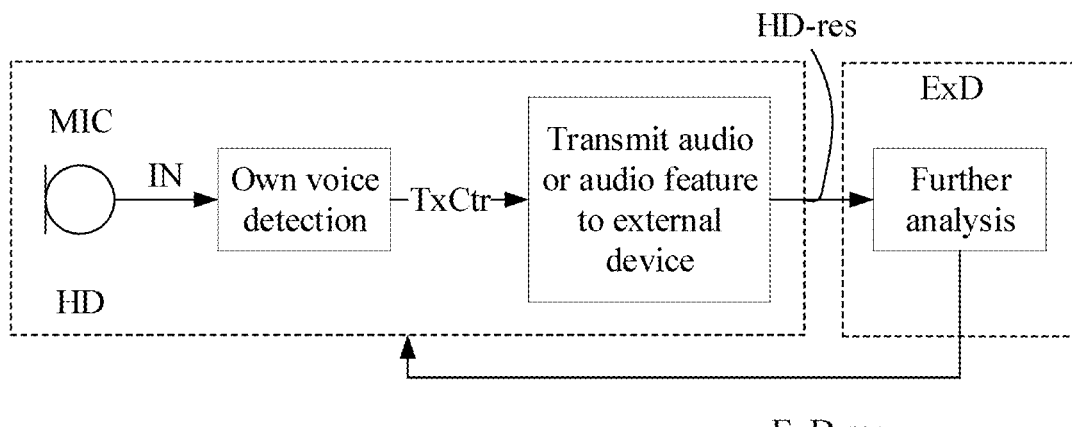

The hearing device may e.g. be configured to only transmit audio, when the user's own voice is detected, as illustrated in 11B. Still, if a person talks a lot, it may be too much data to transmit. As a wake-word typically is spoken in the beginning of a sentence, a second criteria may be to only transmit the first part, e.g. the first few seconds, of a sentence. The data may continuously be stored in a buffer, e.g. a cyclic buffer, and transmitted to the external device based on detection of own voice. The audio data may e.g. be transmitted starting a predefined time period (e.g. around 100 ms) prior to own voice detection, and the duration of the transmitted data may e.g. cover a time segment of the electric input signal, e.g. up to a couple of seconds, e.g. two seconds. This scenario is illustrated in FIG. 11B, which is identical to FIG. 11A apart from the 'Analysis of audio' block specifically comprising an 'own voice detection' block, which provides the transmission flag (transmission control signal TxCtr) for enabling and disabling transmission of a current content of the input buffer (which may be the incoming audio signal or features extracted therefrom) to the external device (ExD).

Figure 11C:
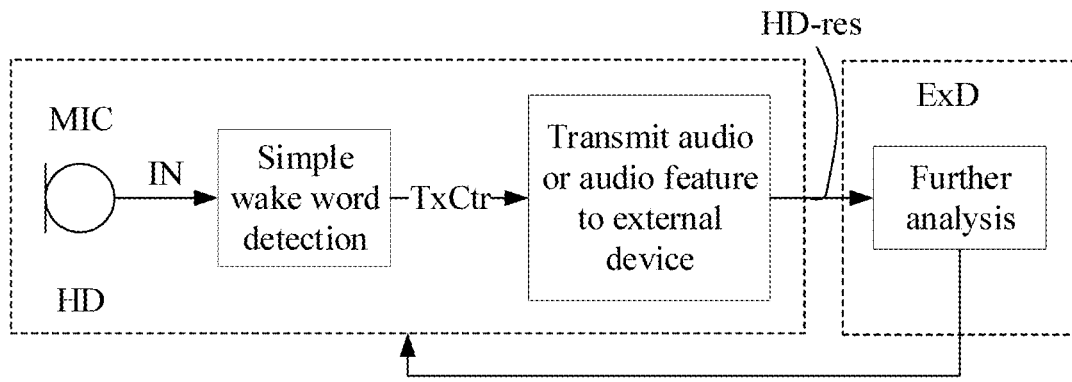

As another alternative, the transmission criterion may be further refined. In addition or as alternative to own voice triggered transmission, the transmission criterion may be improved by implementing a small wake-word system (e.g. based on a small neural network) in the hearing device. This is schematically shown in FIG. 11C. FIG. 11C schematically shows a third embodiment of a part of a hearing device according to the present disclosure as in FIG. 11A or 11B, where the analysis of the incoming signal comprises wake-word detection. A simple wake-word detection may be used to provide the transmission control signal (TxCtr). The wake-word identified by the wake-word detector of the hearing device (or rather the audio data whereon the detection is based) may be analysed further in the external device to achieve an acceptable accuracy. An own voice detection may preferably be part of the 'Simple wake-word detection' system of the hearing device. The external device (ExD) may e.g. be linked up with a cloud service for even further analysis (e.g. of the audio data from the hearing device).

The 'Simple wake-word detection' system may e.g. have a high hit rate (e.g. close to 100%) but a high false alarm rate too. By a further analysis in the external device, the false alarm rate of the wake-word detection can be minimized. The external device may as well contain another own voice detector, for an even better own voice detection compared to that of the hearing device alone. The external own voice analysis may e.g. be based on different features of the speaker's own voice. The external device can be linked up with a cloud service for even further analysis.

In the situation that the local small wake-word spotting algorithm of the hearing device (HD) has detected a wake-word but is over-ruled by the (assumed larger and better) wake-word detector in the external device (ExD), the external device may send a feedback signal to the hearing device (ExD-res), informing its local wake-word spotting algorithm that it disagrees with its decision. This information may be used to re-train/adapt the 'Simple wake-word detection' system to improve its performance. In this way, the 'Simple wake-word detection' system of the hearing device (HD) may improve its performance to approach that of the advanced wake-word detector in the external device (ExD).

Figure 12A:
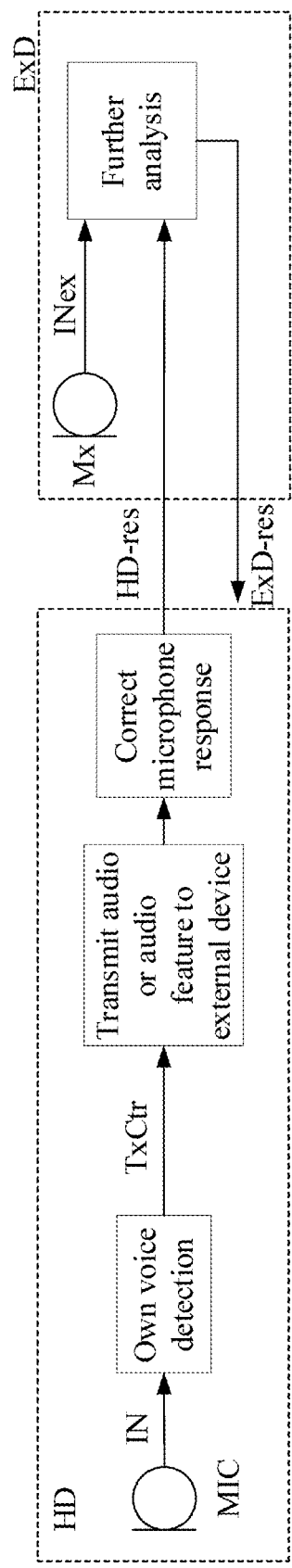
FIGS. 12A and 12B illustrate respective embodiments of a hearing system comprising a hearing device and an external device according to the present disclosure.
Figure 12B:
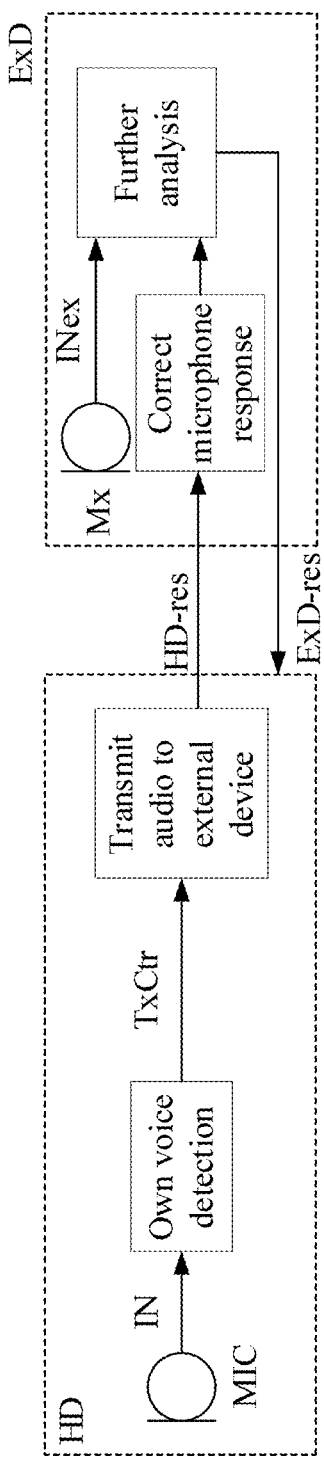

FIGS. 12A and 12B illustrate respective embodiments of a hearing system comprising a hearing device (HD) and an external device (ExD) according to the present disclosure. FIGS. 12A and 12B relate to the embodiment of FIG. 11B illustrating a (part of a) hearing device according to the present disclosure comprising control of the transmission of audio data or data derived therefrom to an external device, based on an analysis of the incoming audio signal, the analysis comprising a detection of the user's own voice. The hearing device (HD) may e.g. be configured to only transmit audio (HD-res), when the user's own voice is detected in the electric input signal (IN) from microphone (MIC). The transmitted audio may be the electric input signal (IN) as such or a time segment (or selected frequency bands) thereof or characteristics (audio features) derived therefrom, cf. unit 'Transmit audio or audio feature to external device', as also illustrated in FIG. 11B. In the embodiments of FIGS. 12A and 12B, however, the external device (ExD), comprises a microphone (Mx) providing an external electric input signal (INex) representing sound in the environment at the external device Hence the further analysis performed in the external device is (or may be) based on the audio input (HD-res) from the hearing device as well as the external electric input signal (INex) (cf. unit 'Further analysis'). The result of the further analysis may be fed back to the hearing device (HD) via signal ExD-res, and used in the hearing device, as a control or enhancement signal.

The aim of the embodiments of FIGS. 12A and 12B is to provide that the further analysis by the external device (ExD) works optimally when the processing is based (also) on the local microphone(s) (Mx) of the external device. In the embodiments of FIGS. 12A and 12B, the frequency response of (e.g. microphones of) the hearing device (HD) is calibrated to have the same response (or characteristics) as the response of the microphone(s) (Mx) in the external device (ExD). The correction (embodied in unit 'Correct microphone response') may be implemented either in the hearing device (HD, FIG. 12A) or in the external device (ExD, FIG. 12B).

Figure 13:
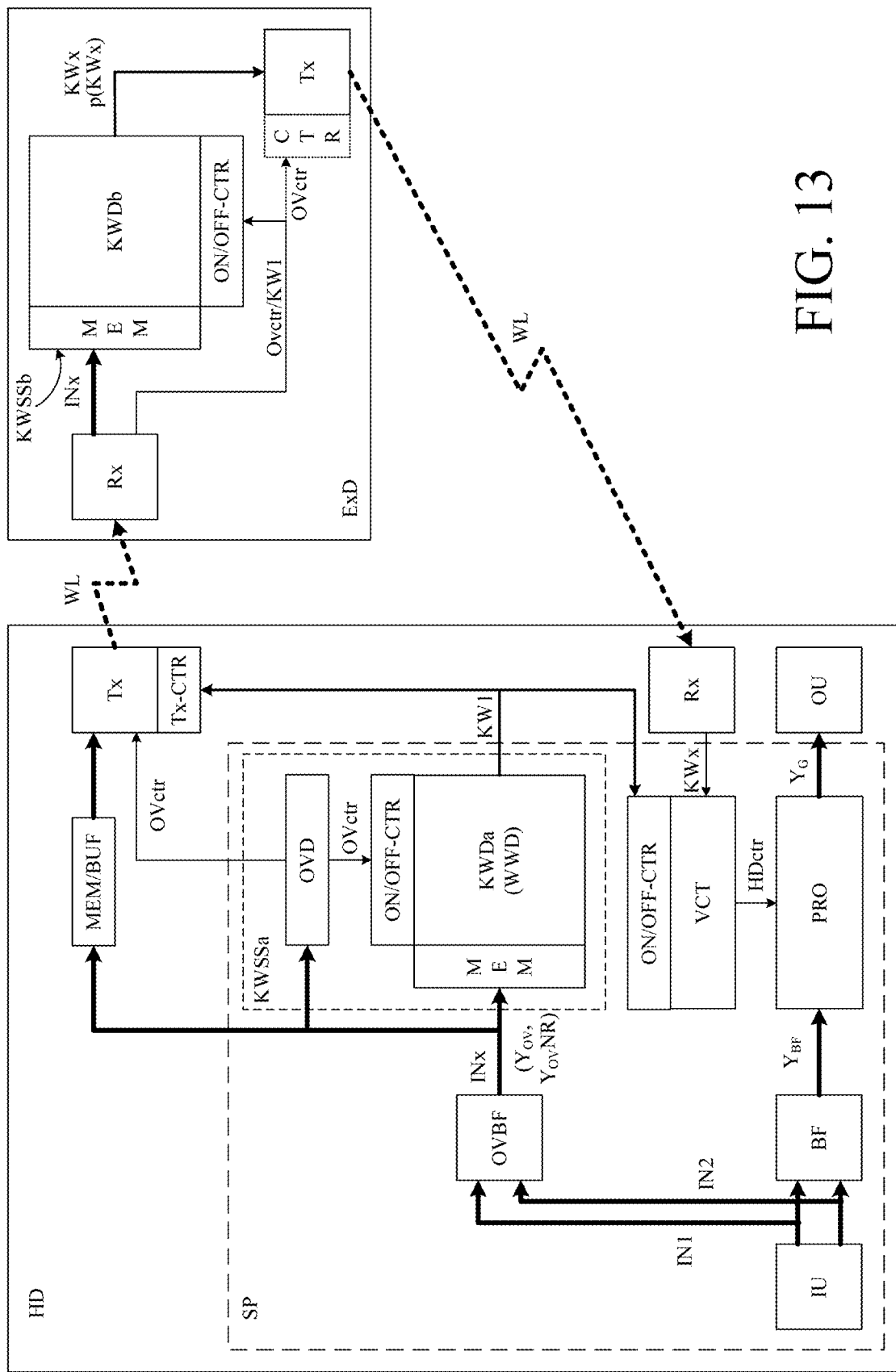
FIG. 13 shows a hearing system according to the present disclosure comprising a hearing device and an external device, wherein elements of key word detection are shown in the context of a voice control interface of a hearing device.

FIG. 13 shows a system according to the present disclosure comprising a hearing device and an external device, wherein elements of key word detection are shown in the context of a voice control interface of a hearing device. The hearing system comprises a keyword spotting system (KWSS) as illustrated and discussed in connection with FIG. 9. In the embodiment of FIG. 13, the keyword spotting system (KWSS) is partitioned between the hearing device (HD) and the external device (ExD) to optimize performance with respect to available power and computing capacity of the respective devices. In the illustration of FIG. 13, the keyword spotting system is configured to support or implement a voice control interface (VCT). A first part (KWSSa, enclosed by dashed rectangle denoted KWSSa) of the keyword spotting system comprising a wake-word detector (KWDa (WWD)) is embodied in the hearing device. The wake-word detector (KWDa) is activated in dependence of a control signal OVctr from an own voice detector (OVD) (cf. ON/OFF-CTR interface to wake-word detector (KWDa)). The own voice control signal (OVctr) and a detected wake-word (KW1) are forwarded to a transmitter (Tx) of the hearing device for transmission to the external device (ExD) together with the detected wake-word (KW1, 'e.g. 'Wakeup Oticon', or the like) (cf. Tx-CTR interface to said transmitter (Tx)). The detected wake-word (KW1) is further forwarded to the voice control interface (VCT) to activate it (cf. ON/OFF-CTR interface to the voice control interface (VCT)). The hearing device comprises an own voice beamformer (OVBF) for estimating a user's own voice based on a combination of the two electric input signals (IN1, IN2) from the input unit (IU, e.g. comprising two (or more) input transducers, such as microphones). The hearing device may comprise a memory buffer (MEM/BUF), e.g. a cyclic buffer, for storing a current time segment of a certain duration of the at least one electric input signal, or a processed version thereof, here the (beamformed) own voice signal Inx (e.g. a spatially filtered own voice signal $Y_{OV}$, or a spatially filtered and further noise reduced signal $Y_{OV}NR$). The signal INx comprising an estimate of the user's voice is fed to a memory-buffer, which allows a time segment of a certain length, e.g. up to 5 s, of audio (equal to or derived from the at input signal INx) to be (temporarily) stored, and e.g. transmitted to an external device in dependence of the transmit control signal. Thereby the identification of a time segment comprising the user's own voice AND a preceding period (e.g. 100 ms or more) of no own voice (which may be indicative of a wake-word or a keyword) is facilitated.

A second part (KWSSb) of the keyword spotting system comprising a more general keyword detector (KWDb), which e.g. is able to identify a multitude of command words (KWx) for the voice control interface (VCT) of the hearing device, is embodied in the external device (ExD). The activation of the second part (KWSSb) of the keyword spotting system is e.g. dependent on the own voice control signal (OVctr) and/or the detection of the wake-word (KW1) (cf. ON/OFF-CTR interface to wake-word detector (KWDb)). The external device comprises a wireless receiver (Rx), which together with the transmitter (Tx) of the hearing device allows a wireless link (WL) between the two devices (from HD to ExD) to be established. Likewise, a wireless link (WL) from the external device (ExD) to the hearing device (HD) can be established by the wireless transmitter (Tx) and receiver (Rx) of the external device and the hearing device, respectively. The external device is configured to transmit (using transmitter Tx of the external device) identified any keywords (KWx, decided to be spoken by the user of the hearing device) via wireless link WL to the hearing device possibly in control of an own voice control signal (OVctr) (cf. CTR interface to said transmitter (Tx)). The keyword(s) received by a receiver (Rx) of the hearing device is(are) forwarded to the voice control interface (VCT) and applied to the signal processor (PRO, cf. signal HDctr) of a forward processing path (from input (IU) to output (OU)) of the hearing device to thereby control processing in the forward path (e.g. change a setting of the hearing device, e.g.

a program, a volume, a mode of operation, etc.). Thereby a voice control interface for the hearing device is implemented partly in the hearing device and partly in the external device. The hearing device (HD) may e.g. form part of or be constituted by a hearing aid configured to compensate for a user's hearing impairment. The external device (ExD) may e.g. be a portable processing device, e.g. a telephone or the like, or a more stationary processing device, e.g. located in a room, e.g. connected to a mains power supply. The forward processing paths comprises input unit (IU) providing electric input signals (IN1, IN2) representing sound, beamformer filtering unit (BF) providing spatially filtered signal ($Y_{BF}$) independence on the input signals (IN1, IN2), signal processor (PRO) for processing the spatially filtered signal and providing a processed signal ($Y_G$), e.g. compensation for a hearing impairment of the user, the processing being e.g. at least partially controlled or controllable via the voice control interface (VCT), and output unit (OU) providing stimuli perceivable as sound for the user based on the processed signal ($Y_G$).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

US20190075406A1 (Oticon) 7 Mar. 2019
[1] J. R. Deller, J. H. L. Hansen, and J. G. Proakis, "Discrete-Time Processing of Speech Signals," IEEE Press, 2000.
[2] P. C. Loizou, "Speech Enhancement—Theory and Practice," CRC Press, 2007.
[3] R. C. Hendriks, T. Gerkmann, J. Jensen, "DFT-Domain Based Single-Microphone Noise Reduction for Speech Enhancement," Morgan and Claypool, 2013.
[4] I. Goodfellow, Y. Bengio, and A. Courville, "Deep Learning", MIT Press 2016.
US20140321682A1 (Oticon) 30 Oct. 2014.
US20150230036A1 (Oticon) 13 Aug. 2015.
EP3413589A1 (Oticon) 12 Dec. 2018.

The invention claimed is:

1. A hearing device configured to be arranged at least partly on a user's head or at least partly implanted in a user's head, the hearing device comprising
   at least one input transducer for picking up an input sound signal from the environment and providing at least one electric input signal representing said input sound signal;
   a signal processor connected to the at least one input transducer, the signal processor being configured to analyze the at least one electric input signal and to provide a transmit control signal in dependence thereof, the signal processor including
      an own voice detector connected to the at least one input transducer, the own voice detector being configured to provide an own voice indicator estimating whether or not, or with what probability, sounds in said at least one electric input signal, originates from the voice of the user of the hearing device,
      a wake-word detector configured to detect a predefined wake-word in the at least one electric input signal or in a signal derived therefrom, and to provide a wake-word indicator estimating whether or not, or with what probability, the wake-word is detected, and
      a controller configured to provide the transmit control signal in dependence of the own-voice indicator and the wake-word indicator;
   a memory buffer for storing a current time segment of a certain duration of said at least one electric input signal, or a processed version thereof; and
   a transmitter for transmitting at least a part of said time segment, or a processed version thereof, to an external device in dependence of said transmit control signal,
   wherein the wake-word detection is activated by the detection of own voice-activity.

2. A hearing device according to claim 1 comprising a voice control interface.

3. A hearing device according to claim 1 wherein the signal processor is configured to transmit a part of the current data stored in the memory buffer to the external device, such part of the data starting a start-time period prior to own voice detection.

4. A hearing device according to claim 1 wherein the signal processor is configured to stop transmission of the data from the memory buffer after a stop-time period.

5. A hearing device according to claim 1 wherein said memory buffer is configured to allow a time segment of up to 5 s of audio to be stored.

6. A hearing device according to claim 1 wherein a transmit period is limited to a duration of time depending on the expected length of the wake-word in question.

7. A hearing device according to claim 1 wherein the wake-word detector is implemented by an algorithm based on a neural network.

8. A hearing device according to claim 7 wherein an input vector to the neural network comprises a number of time-frames of the at least one electric input signal.

9. A hearing device according to claim 8 wherein the input vector to the neural network additionally comprises an own voice control signal indicative of the presence of the user's voice in the at least one electric input signal.

10. A hearing device according to claim 7 wherein an output vector of the neural network comprises a detected wake-word and/or a probability of the detection of the wake-word.

11. A hearing device according to claim 7 wherein the neural network is configured to provide that a specific wake-word can only be accepted as a valid wake-word, if the user's own voice has not been present for a first predefined threshold time period preceding the wake-word, and if the user's voice is active while the keyword is being spoken.

12. A hearing device according to claim 1 wherein the wake-word detector is configured to detect said wake-word for a specific application of the hearing device and/or of the external device.

13. A hearing device according to claim 12 wherein said specific application is activating a voice control interface.

14. A hearing device according to claim 1 being constituted by or comprising a hearing aid, a headset, an earphone, an active ear protection device or a combination thereof.

15. A hearing device according to claim 1 wherein the stop-time period is predefined.

16. A hearing device according to claim 1 wherein the stop-time period is smaller than or equal to five seconds, or smaller than or equal to two seconds.

17. A hearing device according to claim 1 wherein wake-word detection is activated or de-activated by the user via a user interface.

18. A hearing device according to claim 1 wherein the own voice indicator is transmitted from the hearing device to the external device.

19. A hearing device according to claim 1 wherein the controller is configured to activate the keyword detector only when the user's voice is detected by the own voice detector or is detected with a probability larger than a threshold value.

20. A method of operating a hearing device configured to be arranged at least partly on a user's head or at least partly implanted in a user's head is provided, the method comprising:
providing at least one electric input signal representing an input sound signal;
analyzing the at least one electric input signal and providing a transmit control signal in dependence thereof, the analyzing including
providing an own voice indicator estimating whether or not, or with what probability, sounds in said at least one electric input signal, originates from the voice of the user of the hearing device,
detecting a predefined wake-word in the at least one electric input signal or in a signal derived therefrom, and providing a wake-word indicator estimating whether or not, or with what probability, the wake-word is detected, and
providing the transmit control signal in dependence of the own-voice indicator and the wake-word indicator;
sequentially storing a current time segment of a certain duration of said at least one electric input signal, or a processed version thereof; and
transmitting at least a part of said time segment of the electric input signal to an external device in dependence of said transmit control signal
wherein the wake-word detection is activated by the detection of own voice-activity.

21. A method according to claim 20 wherein the hearing device is constituted by or comprises a hearing aid, a headset, an earphone, an active ear protection device or a combination thereof.

* * * * *